(12) United States Patent
Tuerk et al.

(10) Patent No.: US 12,163,110 B2
(45) Date of Patent: *Dec. 10, 2024

(54) AMPHOTERICALLY-MODIFIED OLIGOPROPYLENEIMINE ETHOXYLATES FOR IMPROVED STAIN REMOVAL OF LAUNDRY DETERGENTS

(71) Applicant: BASF SE, Ludwigshafen am Rhein (DE)

(72) Inventors: Holger Tuerk, Ludwigshafen am Rhein (DE); Susanne Carina Engert, Ludwigshafen am Rhein (DE); Alexander Michael Haydl, Mannheim (DE); Robert John Carswell, London (GB); Julie Bennett, London (GB)

(73) Assignee: BASF SE, Ludwigshafen am Rhein (DE)

( * ) Notice: Subject to any disclaimer, the term of this patent is extended or adjusted under 35 U.S.C. 154(b) by 117 days.

This patent is subject to a terminal disclaimer.

(21) Appl. No.: 17/999,967

(22) PCT Filed: May 19, 2021

(86) PCT No.: PCT/EP2021/063393
§ 371 (c)(1),
(2) Date: Nov. 28, 2022

(87) PCT Pub. No.: WO2021/239547
PCT Pub. Date: Dec. 2, 2021

(65) Prior Publication Data
US 2023/0220306 A1    Jul. 13, 2023

(30) Foreign Application Priority Data

May 29, 2020 (EP) ..................... 20177400

(51) Int. Cl.
| | | |
|---|---|---|
| *C11D 3/26* | (2006.01) | |
| *B08B 3/04* | (2006.01) | |
| *C08G 73/02* | (2006.01) | |
| *C11D 3/37* | (2006.01) | |

(52) U.S. Cl.
CPC ........ *C11D 3/3723* (2013.01); *C08G 73/0226* (2013.01); *C11D 2111/12* (2024.01)

(58) Field of Classification Search
CPC ....... C11D 3/26; C11D 3/3723; C11D 3/3769; B08B 3/04; C08G 73/02; C08G 73/0206; C08G 73/0213; C08G 73/0226
See application file for complete search history.

(56) References Cited

U.S. PATENT DOCUMENTS

| | | |
|---|---|---|
| 9,738,754 B2 | 8/2017 | Ebert et al. |
| 2010/0216949 A1 | 8/2010 | Friedrich et al. |
| 2018/0216037 A1 | 8/2018 | Hamersky et al. |
| 2019/0024026 A1 | 1/2019 | Delaney et al. |

FOREIGN PATENT DOCUMENTS

| | | | |
|---|---|---|---|
| EP | 0112593 A2 | 7/1984 | |
| EP | 1198492 A1 | 4/2002 | |
| EP | 1309546 A1 | 5/2003 | |
| EP | 2662436 A1 | 11/2013 | |
| EP | 2961819 A2 | 1/2016 | |
| EP | 2961821 A1 | 1/2016 | |
| EP | 3039057 A1 | 7/2016 | |
| EP | 3039109 A1 | 7/2016 | |
| EP | 3109306 | * 12/2016 | ............... C11D 1/62 |
| EP | 3167034 A1 | 5/2017 | |
| EP | 3301154 A1 | 4/2018 | |
| WO | 1995032272 A1 | 11/1995 | |
| WO | 2001029112 A1 | 4/2001 | |
| WO | 2004020563 A1 | 3/2004 | |
| WO | 2004024858 A1 | 3/2004 | |
| WO | 2016187085 A1 | 11/2016 | |
| WO | 2020030469 A1 | 2/2020 | |

OTHER PUBLICATIONS

European Search Report for EP Patent Application No. 20177400.7, Issued on Nov. 2, 2020, 3 pages.
International Search Report and Written Opinion for corresponding PCT/EP2021/063393 mailed Sep. 20, 2021; 8 pages.

* cited by examiner

*Primary Examiner* — Brian P Mruk
(74) *Attorney, Agent, or Firm* — Armstrong Teasdale LLP

(57) ABSTRACT

Disclosed herein are amphoterically-modified ethoxylated oligoamines, their manufacture, and methods of using them.

19 Claims, No Drawings

AMPHOTERICALLY-MODIFIED OLIGOPROPYLENEIMINE ETHOXYLATES FOR IMPROVED STAIN REMOVAL OF LAUNDRY DETERGENTS

CROSS-REFERENCE TO RELATED APPLICATIONS

This application is a U.S. National Phase Application of International Patent Application No. PCT/EP2021/063393, filed May 19, 2021, which claims priority to European Patent Application No. 20177400.7, filed May 29, 2020, each of which is hereby incorporated by reference herein.

The present invention relates to certain amphoterically-modified ethoxylated oligoamines, their manufacture and use.

In the following, oligo-/polypropyleneimine is also abbreviated "PPI", oligo-/polyethyleneimine is also abbreviated "PEI". Ethoxylated oligo-/polypropyleneimine is referred to as "EPPI" (or "ePPI"), ethoxylated oligo-/polyethyleneimine is referred to as "EPEI" (or "ePEI").

Furthermore, in the following, ethylene oxide is sometimes referred to as "EO" and propylene oxide is sometimes referred to as "PO".

Alkoxylated oligo- and polyalkyleneimines, especially alkoxylated oligo- and polyethyleneimines, are well known as additives for various applications, such as laundry detergents (e.g. EP3301154, EP3167034 and EP112593), additives for cementitious binder systems (WO2016187085), or hard surface cleaners (EP2961819). In case of utilization within laundry applications, benefits on both primary cleaning and secondary cleaning performance have been mentioned, but any specific impact on rheology has not been disclosed.

Moreover, some reports on alkoxylated oligo- and polyalkyleneimines, especially on alkoxylated oligo- and polyethyleneimines exist, describing the effect on the viscosity of formulations. US20180216037 and US20190024026 both describe polyethyleneimines reacted with ethylene oxide and propylene oxide (e.g. PEI-$(EO)_{10}(PO)_5$) as viscosity modifier for formulations containing anionic surfactants. The PEI alkoxylate is used to reduce the viscosity of the surfactant formulation. In contrast, benefits on cleaning performance have not been disclosed.

Furthermore, WO2020/030469 describes ethoxylated polyethyleneimines with a high molecular weight polyethyleneimine core, which are prepared by using a specific process (strong under-hydroxyethylation) to obtain additives for laundry application with a good performance profile and, at the same time, exhibiting a reduced negative impact on the viscosity of the detergent formulation.

In contrast, modified oligo- and polyalkyleneimine alkoxylates are less common.

EP2662436 describes cationic alkoxylated polyethyleneimines in combination with bleach boosters for automatic dish wash applications. Both hydrophobically- and amphoterically-modified polyalkyleneimines for detergent compositions are described in WO2004020563.

Laundry compositions containing alkoxylated and optionally further cationically- or amphoterically-modified polyalkyleneimines bearing at least 6 N-atoms per molecule are described in EP2961821 for example. More specifically oligo- and polypropyleneimines exhibiting at least 6 N-atoms per molecule, modified and unmodified, are disclosed which lead to benefits in soil removal and contribute to improved whiteness. Any impact on the rheology of the detergents has not been mentioned.

In addition, EP3039109 and EP3039057 describe predominantly ethoxylated and optionally further amphoterically-modified oligo- and polyalkyleneimines with low melting points. Due to the incorporation of at least one mol of a C3 to C5 alkylene oxide into the polyalkoxylate chains, mainly based on ethylene oxide, polymers with low melting points can be obtained being favorable for their preparation process. Any benefits in terms of application performance in comparison to identical polymers based solely on ethylene oxide and thus higher melting points have not been mentioned.

Furthermore, EP1198492 describes zwitterionic (i.e. amphoterically-modified) alkoxylated polyamines with improved thermal stability, used as additives for laundry detergents. In general, the amphoteric modification of the materials has been obtained by a combination of independent quaternization and sulfation steps, wherein the sulfation has been carried out with a sulfation agent such as chlorosulfonic acid. The described zwitterionic polyamines have a net anionic charge, i.e. the number of cationic groups exceeds the number of anionic groups by at least 20%, preferably by at least 50%. An improved benefit on cleaning performance and a positive impact on the viscosity of the detergents has not been mentioned.

The process of manufacturing alkoxylated and further amphoterically-modified oligo- and polyalkyleneimines is in principle already known in literature.

As mentioned before, the manufacturing process of alkoxylated zwitterionic polyamines, wherein the alkoxylates have been quaternized with a modification agent (1) and sulfatized using a different modification agent (2) (e.g. chlorosulfonic acid), are described in EP1198492. The obtained structures have a net anionic charge.

WO2001029112 describes a process for the sulfation of alkoxylated quaternized polyamines using sulfur trioxide as sulfation agent, allowing high sulfation degrees. The described structures also possess a net anionic charge.

A process based on a combination of alkoxylation, quaternization and transsulfation starting from tertiary aminoalcohols has been described in EP 1309546. The process includes the reaction of a tertiary amine with a sulfation precursor (e.g. dialkyl sulfate) forming an admixture comprising a quaternized amine and a sulfating species. The hydroxyl species has then been sulfated under acidic conditions. More specifically, the preparation of alkoxylated, quaternized and fully sulfated oligo- and polyalkyleneimines has been disclosed, by using auxiliary amines. The obtained polymers did not contain any free hydroxyl groups anymore, i.e. all groups have been converted into sulfate groups. Therefore, the net charge of the described polymers has been anionic.

Another process based on a combination of alkoxylation, quaternization and transsulfation without the use of auxiliary amines has been described in WO200424858. The process includes the reaction of a tertiary amine in the backbone of an alkoxylated oligo- or polyamine with a sulfation precursor (e.g. dialkyl sulfate) forming an admixture comprising a quaternized polyamine alkoxylate and a sulfating species. The hydroxyl species has then been sulfated under acidic conditions. Depending on the degree of conversion of the transsulfation process, polymers exhibiting either a neutral or a slightly net cationic charge could have been obtained. In any case, the polyalkylene oxide blocks contain free terminal hydroxyl groups besides anionic sulfate groups. The same process has also been described for specific polyamine backbones and for specific polyalkylene oxide side chains in the above-mentioned patents EP2961821, EP3039109 and EP3039057.

Although several different unmodified and modified oligo- and polyalkyleneimine alkoxylates and their manufacturing process have been already described in the prior art that exhibit good cleaning performance in laundry application and which also did not lead to a huge negative impact on the rheology of the detergent formulations in some cases, there was still a need for better materials, especially in terms of better performance at lower dosage (improved weight-efficiency of the polymers). Furthermore, there was a need for polymers with good or even improved cleaning performance in laundry applications, and low or even no (negative) influence on viscosity of laundry formulations. In addition, there was also a need for a simple preparation process, avoiding the usage of more than one modification agent for quaternization and sulfation and/or avoiding the usage of auxiliary materials.

Surprisingly, it has been found in the present invention that specific amphoterically-modified oligopropyleneimine ethoxylates can contribute to significantly improved stain removal of laundry detergents, and at the same time lead to minimized negative impact on the viscosity of the formulations. The improved performance of the inventive materials vs. the prior art polymers is especially visible at very low inclusion levels, which is an important prerequisite for an application in top loader machines. Their higher weight-efficiency favors their usage in highly concentrated product forms, e.g. in single mono doses. The inventive amphoterically-modified oligopropyleneimine ethoxylates can be easily obtained starting from the respective oligoamine by a combination of ethoxylation, quaternization and transsulfation, whereas the quaternization and the transsulfation are carried out using dialkyl sulfate as single modification agent, i.e. an usage of more than one modification agent and/or the usage of auxiliary materials are not needed. The inventive amphoterically-modified oligopropyleneimine ethoxylates have a neutral or slightly net cationic charge, depending on the degree of conversion during the transsulfation step.

Thus, one aspect of the present invention are amphoterically-modified oligopropyleneimine ethoxylates (A) of general formula (I)

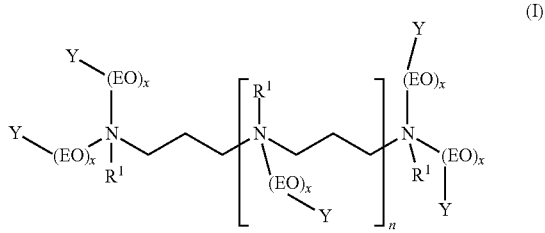

wherein
R$^1$ are same or different and selected from C$_1$-C$_4$-alkyl, H and a free electron pair, wherein at least 50%, preferably at least 80%, more preferably at least 90%, of all R$^1$ are C$_1$-C$_4$-alkyl,
EO means —CH$_2$—CH$_2$—O,
Y are same or different and selected from SO$_3^-$ and H, wherein at least 30%, preferably at least 50% of all Y are SO$_3^-$,
x are same or different and selected from 5 to 50, preferably 10 to 40, and n is selected from 1, 2 and 3.

The inventive amphoterically-modified oligopropyleneimine ethoxylates (A) are internal zwitterions. The counterions of the quaternized nitrogen atoms are SO$_3^-$ ions or alkyl sulfate ions (C$_1$ to C$_4$ monoalkyl sulfates).

After optional neutralisation and optional dilution with water, further anions and cations are present in the mixture, still the polymer itself can be considered as an internal zwitterion.

In a preferred embodiment, from 93% to 97% of all R$^1$ are C$_1$-C$_4$-alkyl.

In a preferred embodiment of the inventive amphoterically-modified oligopropyleneimine ethoxylates (A) of general formula (I), n is 2 or 3, and/or at least 90% of all R$^1$ are methyl.

In a further preferred embodiment of the inventive amphoterically-modified oligopropyleneimine ethoxylates (A) of general formula (I), n is 2, and/or at least 90% of all R$^1$ are methyl, and/or x is in the range of 15 to 30.

In a further preferred embodiment of the inventive polymers, n=1, 2 or 3, at least 80% of R$^1$ are C$_1$-C$_4$-alkyl and the ratio of R$^1$=C$_1$-C$_4$-alkyl to Y=SO$_3^-$ is on average from 1.0:1.0 to 1.0:0.8.

Further aspects of the present invention include:
A mixture of compounds, comprising at least one amphoterically-modified oligopropyleneimine ethoxylate (A) according to formula (I) wherein n=2 and at least one isomeric compound according to formula (II)

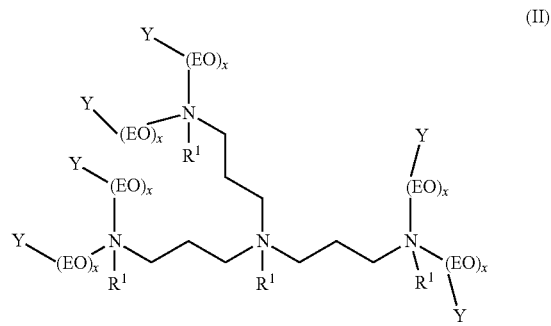

wherein
R$^1$ are same or different and selected from C$_1$-C$_4$-alkyl, H and a free electron pair, wherein at least 50%, preferably at least 80%, more preferably at least 90%, of all R$^1$ are C$_1$-C$_4$-alkyl,
EO means —CH$_2$—CH$_2$—O,
Y are same or different and selected from SO$_3^-$ and H, wherein at least 30%, preferably at least 50% of all Y are SO$_3^-$,
x are same or different and selected from 5 to 50.

A preferred mixture of compounds, as described above, comprises an amphoterically-modified oligopropyleneimine ethoxylate (A) according to formula (I) and compounds according to formula (II) in a total molar ratio in the range of from 10:1 or higher.

In a preferred embodiment of the present invention, the inventive amphoterically-modified oligopropyleneimine ethoxylates (A) are obtained in a mixture additionally comprising the sulfate of an alkali metal and/or an amine.

In a further preferred embodiment of the inventive mixture of compounds, the mixture additionally comprises the sulfate salt of an amine, preferably the sulfate salt of an alkanolamine.

In another preferred embodiment of the present invention, the inventive amphoterically-modified oligopropyleneimine ethoxylates (A) and mixtures containing the same, are mixed with water in any ratio. Preferably, the mixture contains from 1 to 80 wt % water, more preferably 1 to 60 wt % water, even more preferably 5 to 50 wt % water and most preferably 10 to 40 wt % water.

To the aqueous solutions of the inventive amphoterically-modified oligopropyleneimine ethoxylates (A) and mixtures containing the same, may be added also at least one antimicrobial agent. Preferably, 2-phenoxyethanol (CAS-no. 122-99-6, for example Protectol® PE available from BASF) or 4,4'-dichloro-2-hydroxydiphenylether (CAS: 3380-30-1), and combinations thereof, are being used.

The 4,4'-dichloro-2-hydroxydiphenylether may be used as a solution, for example a solution of 30 wt % of 4,4'-dichloro-2-hydroxydiphenylether in 1,2-propyleneglycol, e. g. Tinosan® HP 100 available from BASF.

Process for Manufacturing Inventive Compounds

A further aspect of the present invention is also a process for making inventive amphoterically-modified oligopropyleneimine ethoxylates (A), said process comprising the steps of (a) providing an amine selected from ammonia, 1,3-propylendiamine, bis-(3,3'-aminopropyl)amine, and bis-(3,3'-aminopropyl)-1,3-propylenediamine, or mixtures thereof
(b) optionally cyanoethylation of said amine with acrylonitrile in a ratio from 100:1 to 1:2.5, preferably from 10:1 to 1:2.5, more preferably from 3:1 to 1:2.1, followed by hydrogenation, to obtain oligopropyleneimines with 2, 3 and 4 repeating units,
(c) optionally purification of the oligopropyleneimine from step (b),
(d) ethoxylation of said amine and/or oligopropyleneimine from step a, b or c, and,
(e) at least partial quaternization and transsulfation with a di-$C_1$-$C_4$-alkyl sulfate.

In a preferred embodiment of the inventive process, the purification step (c) is performed to obtain oligopropyleneimines with 2, 3 and 4 repeating units, or mixtures thereof, with a purity of at least 80 wt %, preferably at least 90 wt %.

In a preferred embodiment of the inventive process described above, the quaternization in step (e) is performed with dimethyl sulfate.

In a further preferred embodiment of the inventive process described above, the transsulfation in step (e) is performed with sulfuric acid as a catalyst.

In a further preferred embodiment of the inventive process, the transsulfation in step (e) is performed quantitatively (>=80%) and a slightly cationic or net neutral polymer is obtained.

In a further preferred embodiment of the inventive process described above, the process additionally includes a subsequent step of neutralization of the sulfuric acid with a base selected from alkali metal hydroxides and amines. Preferably, a base selected from amines, more preferably alkanolamines, or aqueous solutions thereof may be used.

In a preferred embodiment of the inventive process, the ethoxylation in step (d) is performed in two sub-steps, viz. (i) conversion with up to one mole of EO per N—H function, followed by (ii) conversion with more ethylene oxide under alkaline catalysis.

A further aspect of the present invention are also amphoterically-modified oligopropyleneimine ethoxylates (A) as defined above, obtainable by the inventive process described above (and described below in more detail).

Steps (a) to (c) of the inventive process mentioned above may be performed as follows.

Via Route A:

One equivalent of acrylonitrile may be added dropwise to an excess of either 1,3-propylenediamine, bis-(3,3'-aminopropyl)amine, or bis-(3,3'-aminopropyl)-1,3-propylenediamine, or mixtures thereof (up to 100 equivalents), optionally dissolved in a solvent, in a reaction vessel at a temperature between 5° C. and 80° C., as previously described in CN107311891. Upon complete addition, the reaction may be stirred at the indicated temperature until the starting materials were fully consumed and then cooled to room temperature. After optional purification (but preferably without purification), the crude mixture may be subjected to a hydrogenation in a pressure reactor catalyzed by a [Cu], [Co], [Ni], [Pd], [Pt] or [Ru] catalyst with or without solvent at elevated hydrogen and optionally ammonia pressures, as described previously in DD238043 and/or JP08333308 and/or WO2018046393. During the hydrogenation, the temperature may be between 70° C. and 200° C., preferably between 70° C. and 150° C., and the hydrogen pressure between 1 and 250 bar, preferably between 50 and 250 bar. The catalyst may be removed, for example by filtration, and volatiles may be removed under reduced pressure. The obtained mixture of the desired oligoamino compounds may be then separated in the next step via distillation under reduced pressure (<1 bar) to yield the purified target compounds, bis-(3,3'-aminopropyl)amine, bis-(3,3'-aminopropyl)-1,3-propylenediamine or tris-(3,3',3"-aminopropyl)-1,3-propylenediamine.

Via Route B:

Acrylonitrile (up to 2.5 equivalents) may be added dropwise to one equivalent of either ammonia, 1,3-propylenediamine, bis-(3,3'-aminopropyl)amine, or bis-(3,3'-aminopropyl)-1,3-propylenediamine, or mixtures thereof, optionally dissolved in a solvent, in a reaction vessel at a temperature between 5° C. and 80° C., as previously described in CN102941160 and/or WO9214709. Upon complete addition reaction, the reaction may be stirred at the indicated temperature until the starting materials were fully consumed and then cooled to room temperature. After optional purification (but preferably without purification), the crude mixture may be subjected to a hydrogenation in a pressure reactor catalyzed by a [Cu], [Co], [Ni], [Pd], [Pt] or [Ru] catalyst with or without solvent at elevated hydrogen and optionally ammonia pressures, as described previously in DD238043 and/or JP08333308 and/or WO 2018046393. During the hydrogenation, the temperature may be between 70° C. and 200° C., preferably between 70° C. and 150° C., and the hydrogen pressure between 1 and 250 bar, preferably between 50 and 250 bar. The catalyst may be removed, for example by filtration, and volatiles may be removed under reduced pressure. The obtained mixture of the desired oligoamino compounds may be then separated in the next step via distillation under reduced pressure (<1 bar) to yield the purified target compounds, bis-(3,3'-aminopropyl)amine, bis-(3,3'-aminopropyl)-1,3-propylenediamine or tris(3,3',3"-aminopropyl)-1,3-propylenediamine.

The crude mixture according to route (A) or (B) contains predominantly (>50 mol %) linear oligoamines, preferably more than 70 mol % linear oligoamines, more preferably more than 80 mol % linear oligoamines.

In a preferred embodiment of the invention, the crude mixture according to route (A) or (B) is purified by distillation, to remove any impurities from monomers, other oligomers or branched structures and branched isomers, respectively, to obtain the linear target compounds, bis-(3, 3'-aminopropyl)amine, bis-(3,3'-aminopropyl)-1,3-propylenediamine or tris-(3,3',3''-aminopropyl)-1,3-propylenediamine, or mixtures thereof, with a purity of at least 80 wt %, more preferably at least 90 wt % and even more preferably >95 wt %.

In one embodiment of the invention, the purified bis-(3,3'-aminopropyl)-1,3-propylenediamine, or mixtures containing the same, may contain an isomeric compound (structure after alkoxylation/modification according to formula (II)) in a ratio of 10:1 mol % or higher.

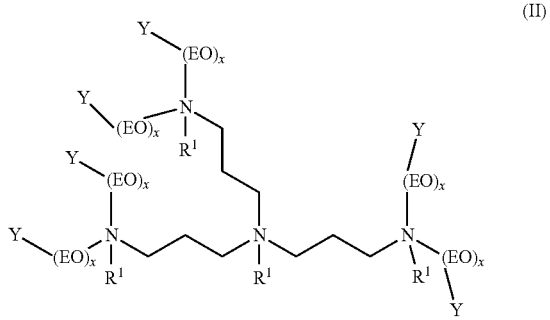

wherein
$R^1$ are same or different and selected from $C_1$-$C_4$-alkyl, H and a free electron pair, wherein at least 50%, preferably at least 80%, more preferably at least 90%, of all $R^1$ are $C_1$-$C_4$-alkyl,
EO means —$CH_2$—$CH_2$—O,
Y are same or different and selected from $SO_3^-$ and H, wherein at least 30%, preferably at least 50% of all Y are $SO_3^-$,
x are same or different and selected from 5 to 50.

Step (d) of the above manufacturing process may be performed as follows.

The inventive process step (d) is characterized by using only ethylene oxide as alkoxylation agent. Other alkylene oxides like propylene oxide are not useful for the inventive process and do not lead to the inventive product and its properties in laundry application.

In a preferred embodiment of step (d) of the inventive manufacturing process, ethoxylation is performed in two steps.

According to a preferred embodiment of the invention, the ethylene oxide is added in a first step (i) of process step (d) in an amount of 0.2 to 1.0 ethylene oxide units per NH-group of the oligopropyleneimine (PPI), preferably 0.5 to 0.99, more preferably 0.6 to 0.95 ethylene oxide units per NH-group of the oligopropyleneimine (PPI), even more preferably 0.70 to 0.95 ethylene oxide units per NH-group of the oligopropyleneimine (PPI) (under-hydroxyethylation).

In a preferred embodiment of the inventive process, the minimum amount of ethylene oxide units per NH-group added in step (i) is at least identical to the amount of basic catalyst C added later in step (ii), or higher, in order to prevent formation of polyethylene glycol via direct reaction of catalyst C with ethylene oxide during step (ii).

Preferably, the sum of the amounts of ethylene oxide EO added in steps (i) and (ii) lies in the range of 5 to 50 ethylene oxide units per NH-group of the oligopropyleneimine (PPI), more preferably 10 to 40 ethylene oxide units per NH-group of the oligopropyleneimine (PPI), further preferably 15 to 30 ethylene oxide units per NH-group of the oligopropyleneimine (PPI).

Preferably, the first step (i) of process step (d) is carried out in the absence of a basic catalyst. Water may be added in the first step (i) of process step (d).

In one embodiment of the present invention, the second step (ii) of step (d) the inventive process is carried out in the presence of a basic catalyst. Suitable bases are such as LiOH, NaOH, KOH, CsOH and mixtures thereof, sodium or potassium alkoxides such as potassium methylate ($KOCH_3$), potassium tert-butoxide, sodium methylate ($NaOCH_3$), sodium n-hexanolate and sodium ethoxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides, preference being given to potassium hydroxide and sodium hydroxide, and to alkali metal alkoxides, preference being given to potassium methylate ($KOCH_3$) and sodium methylate ($NaOCH_3$). Particular preference is given to potassium hydroxide and to potassium methylate ($KOCH_3$). Typical use amounts for the base, for example KOH, are from 0.02 to 10% by weight, in particular from 0.05 to 1% by weight, relative to the ethoxylated oligopropyleneimine (EPPI).

In a preferred embodiment of the inventive process, the basic catalyst C is only used in the second step (ii) and is selected from the group consisting of alkaline earth metal containing basic catalysts.

A specifically preferred embodiment of a basic catalyst in the inventive process is KOH; KOH may be used in the inventive process as a solution in water.

In an embodiment of the inventive process, the basic catalyst C is added in an amount of 0.05 to 0.3% by weight, preferably 0.15 to 0.25% by weight, relative to the ethoxylated oligopropyleneimine (EPPI).

In an embodiment, the temperature during the first step (i) of step (d) of the inventive process is in the range of 90° C. to 160° C., preferably 100° C. to 150° C., more preferably 110° C. to 140° C.

In an embodiment, the temperature during the second step (ii) of step (d) of the inventive process is in the range of 100° C. to 180° C., preferably 120° C. to 160° C., more preferably 120° C. to 145° C.

Higher temperatures than specified above during the alkoxylation steps are also possible, but are not preferred, since they usually lead to (more) colored products.

In one embodiment of the present invention, the reaction during the first step (i) of step (d) of the inventive process may be carried out at a total pressure of up to 15 bar, preferably up to 10 bar, for example 1 to 6 bar. Preferred vessels for carrying out the reaction are autoclaves and tubular reactors.

In one embodiment of the present invention, the reaction during the second step (ii) of step (d) of the inventive process may be carried out at a total pressure of up to 15 bar, preferably up to 10 bar, for example 2 to 10 bar. Preferred vessels for carrying out the reaction are autoclaves and tubular reactors. The reaction during the second step (ii) of step (d) of the inventive process can be interrupted at different intermediates (i.e. alkoxylation degrees) and can be continued with or without additional catalyst addition.

The product obtained after step (ii) of step (d) of the inventive process, i.e. ethoxylated oligopropyleneimine (EPPI), may be treated with a bleaching agent. The bleaching agent is preferably selected from the group consisting of borates, hypochlorites, borohydrates and hydrogen peroxide.

Step (e) of the inventive process mentioned above: (At least partial) Quaternization and transsulfation with a di-$C_1$-$C_4$-alkyl sulfate.

The quaternization and transsulfation step (e) is a process based on a combination of quaternization of the amino groups in the backbone of the EPPI and sulfation of the terminal hydroxyl moieties of the polyethylene oxide side chains. In a more general view, the quaternization and transsulfation step (e) is comprising a sub-step (e1) which forms a sulfating species (=quaternization) and a sub-step (e2) which provides controllable sulfation of one or more hydroxyl moieties (=transsulfation).

The first required sub-step (e1) of the process is conducted under basic or close to pH-neutral conditions. The second sub-step (e2) of the process is conducted under acidic conditions.

The process is described in detail in the following:

Sub-step (e1) (quaternization): In a preferred embodiment of the present invention, from 0.5 to 1.0 equivalents of a sulfating agent, preferably from 0.8 to 0.99 equivalents and most preferably from 0.9 to 0.99 equivalents are reacted with one tertiary amino group of the ethoxylated oligopropyleneimine, to form quaternary ammonium ions in the oligoamine backbone and an equal amount of sulfating species. If desired the process may be conducted in the presence of a solvent, preferably non-reactive solvents like toluene, glyme or diglyme may be used. The preferred sulfating agent according to the present invention are dialkyl sulfates, preferably di-$C_1$-$C_4$-alkyl sulfate, more preferably di-$C_1$-$C_2$-alkyl sulfate and most preferably dimethyl sulfate. Substep (e1) of the process of the present invention is conducted under basic or close to pH-neutral conditions, at a temperature of 0° C. to 180° C., preferably 40° C. to 100° C. and even more preferably 50° C. to 90° C. The reaction when exothermic can be controlled by any suitable means, e.g. by cooling of the reaction vessel or by providing a reflux condenser.

Sub-step (e2) (transsulfation): The formation of a sulfated hydroxyl species is the second required step of the process of the present invention. One equivalent of a sulfating species is required per hydroxyl moiety which is to be sulfated. The number of sulfating species in the inventive process is identical to the number of quaternary ammonium ions in the oligoamine backbone. Depending on the degree of conversion during the transsulfation step, the obtained product after sub-step (e2) will be an amphoterically-modified polymer with either (i) a net charge of zero (=neutral polymer), i.e. identical number of quaternary ammonium ions in the oligoamine backbone and sulfated hydroxyl groups, in case of a full (100%) conversion of the sulfating species during the transsulfation step; Or (ii) a positive net charge (=slightly cationic polymer), i.e. slightly higher number of quaternary ammonium ions in the oligoamine backbone in comparison to sulfated hydroxyl groups, in case of an only partial (<100%) conversion during the transsulfation step. In order to control the degree of conversion during the transsulfation step, the formulator can remove the alcohol, preferably the $C_1$-$C_4$-alcohol, most preferably methanol (depending on the type of di-$C_1$-$C_4$-alkyl sulfate employed in step (e1)), which is formed as by-product. In fact, the relative amount of alcohol by-product which is removed can be used as a tool to control the degree of conversion of the transsulfation step. Any process which is convenient to the formulator, e.g. distillation, absorption into a molecular sieve, crystallization or precipitation, may be used, preferably distillation. In many instances, removal of the by-product alcohol already during the reaction will be preferred, preferably by distillation.

The degree of conversion during the transsulfation step according to the present invention is at least 50%, preferably at least 80%. Thus, the preferred ratio of $R^1$=$C_1$-$C_4$-alkyl to Y=$SO_3^-$ in formula (I) is on average from 1.0:1.0 to 1.0:0.8.

The final product after sub-step (e2) is obtained as an internal zwitterion with potentially additional cationic charge in case of incomplete conversion (<100%) of the sulfating species during the transsulfation step. The counterions of the quaternized nitrogen atoms are $SO_3^-$ ions leading to the formation of the internal zwitterions, and potentially additional alkyl sulfate ions ($C_1$ to $C_4$ monoalkyl sulfates), preferably methyl sulfate ions, in case of incomplete conversion during the transsulfation step.

Sub-step (e2) must be conducted under acidic conditions. Suitable acids are, inter alia, sulfuric acid, hydrochloric acid, methanesulfonic acid or Lewis acids (e.g. boron trifluoride). In the process according to the present invention, preferably sulfuric acid is employed. The acid may be added in any amount sufficient to form the desired product, however, the process of the present invention is conducted at a pH less than about 6, preferably less than about 4, more preferably less than about 3 and most preferably at a pH around 2. In fact, acid levels from about 0.01 to 1 molar ratio relative to the ethoxylated oligopropyleneimine (EPPI) are preferred. The catalyst can be introduced by any manner which is convenient to the formulator, however, good mixing should be utilized. Alternatively, the acid may be generated in situ by adding excess sulfating agent and allowing this excess agent to react with a limited source of proton, inter alia, water. Sub-step (e2) of the process of the present invention is conducted at a temperature of 0° C. to 200° C., preferably 40° C. to 150° C. and even more preferably 70° C. to 120° C. The reaction when exothermic can be controlled by any suitable means, e.g. by cooling the reaction vessel or by providing a reflux condenser.

The use of sulfuric acid in the preferred embodiment of the present invention may lead to additional sulfation of hydroxyl groups of the ethoxylated oligopropyleneimine as a side-reaction to a minor extent, besides the conversion of hydroxyl groups to sulfate groups from the transsulfation process (i.e via the employed di-$C_1$-$C_4$-alkyl sulfate).

The final product after sub-step (e2) may be further purified to remove volatile byproducts and/or the acidic catalyst, preferably the sulfuric acid, or may be isolated as mixture. Volatile byproducts, e.g. 1,4-dioxane, may be removed, e.g. via distillation or stripping under vacuum. In case that the acidic catalyst is not removed from the final product after sub-step (e2), the mixture may be isolated as such or the acidic catalyst may be neutralized. In a preferred embodiment of the present invention, the acidic catalyst is not removed, but neutralized. Any suitable base may be used to neutralize the acidic, inter alia, ammonium hydroxide, lithium hydroxide, sodium hydroxide, potassium hydroxide, magnesium hydroxide, calcium hydroxide, barium hydroxide or amines. Preferably, lithium hydroxide, sodium hydroxide, potassium hydroxide or amines are being used, even more preferably sodium hydroxide, alkanolamines, or aqueous solutions thereof.

In one embodiment of the present invention, alkanolamines are being used for the neutralization of the acidic catalyst. In case the employed acid is sulfuric acid, the sulfate salt of an alkanolamine is being formed and the inventive amphoterically-modified oligopropyleneimine ethoxylates (A) are finally obtained in a mixture additionally comprising the sulfate salt of an alkanolamine and water, if aqueous solutions of the bases are being used.

The final product after sub-step (e2), if applicable after removal or neutralization of the acidic catalyst, may be mixed with water in any ratio. Preferably, the final product after sub-step (e2) is mixed with 1 to 80 wt % water, more preferably 1 to 60 wt % water, even more preferably 5 to 50 wt % water and most preferably 10 to 40 wt % water, in order to lower the viscosity and to improve the handling.

An optional step of work-up may also include the adjustment of the pH of the final product, especially if the product is obtained as aqueous solution. Any suitable base or acid may be used to adjust the pH. Preferably, sodium hydroxide, potassium hydroxide or amines are being used as base; Sulfuric acid, hydrochloric acid or methanesulfonic acid as acid. In one embodiment of the present invention, alkanolamines are being used to adjust the pH. A neutral to slightly alkaline pH of the aqueous solution of the inventive polymer is preferred to protect the sulfate groups from being hydrolyzed and cleaved to free hydroxyl groups. Therefore, the pH of the final product in water is preferably adjusted to pH 6 to 14, more preferably to pH 6 to 11 and even more preferably to pH 7 to 10.

Furthermore, antimicrobial agents may be added to improve the preservation of the aqueous solution of the final product.

The following is a non-limiting example of the process according to the present invention:

The alkoxylate product obtained from step (d) of the inventive process described above may be heated to an elevated temperature, usually between 50° and 90° C., and filled into the reactor under protective atmosphere (e. g. nitrogen atmosphere). A molar excess relative to the ethoxylated oligopropyleneimine (EPPI) of a di-$C_1$-$C_4$-alkyl sulfate, for example dimethyl sulfate (DMS), may be dosed into the reactor, preferably within a time span between 1 hour and 5 hours, in a way that the temperature in the reactor does not exceed 90° C. The reaction may then be stirred for a while to complete the reaction, for example between one hour and five hours, at a temperature not exceeding 90° C.

Less than one equivalent sulfuric acid relative to the ethoxylated oligopropyleneimine (EPPI) may then be added, and the temperature may be set to a value between 70° and 120° C. The reactor may be set under vacuum (for example 5 to 30 mbar) for one to six hours, optionally under inert gas stripping. After completion of the reaction, sodium hydroxide or triethanolamine (preferably in aqueous solution) and demineralized water may be added, and the pH may be adjusted to pH 7 to 10. Then the liquid product may be removed from the reactor.

The step of transsulfation (second part of step (e) of inventive process) may also be performed in analogy to the process described in WO200424858A1 (Example 4).

The finally obtained polymers according to this invention have a weight-average molecular weight (determined by GPC, cf. experimental part) of 1000 to 20000 g/mol, preferably 1500 to 15000 g/mol and even more preferred 2000 to 10000 g/mol. In a preferred embodiment of the invention, the amphoterically-modified oligopropyleneimine ethoxylates (A) have a weight-average molecular weight of 2500 to 8000 g/mol.

Laundry Formulations Comprising Inventive Compounds

Another aspect of the present invention is also a laundry formulation, comprising at least one of the inventive amphoterically-modified oligopropyleneimine ethoxylates (A) and/or an inventive mixture of compounds as described above.

Thus, an aspect of the present invention is also the use of the inventive amphoterically-modified oligopropyleneimine ethoxylates (A) and/or an inventive mixture of compounds, as described above, in laundry applications.

The laundry formulations according to the invention can be liquid, gels, or solid compositions, solid embodiments encompassing, for example, powders and tablets. Liquid compositions may be packaged as unit doses.

In one embodiment of the present invention, the amphoterically-modified oligopropyleneimine ethoxylate (A) is a component of a laundry formulation (also called laundry care composition in this specification) that additionally comprises at least one anionic surfactant (B).

Examples of suitable anionic surfactants (B) are alkali metal and ammonium salts of $C_8$ alkyl sulfates, of $C_{12}$-$C_{18}$-fatty alcohol ether sulfates, of $C_{12}$-$C_{18}$-fatty alcohol polyether sulfates, of sulfuric acid half-esters of ethoxylated $C_4$-$C_{12}$-alkylphenols (ethoxylation: 3 to 50 mol of ethylene oxide/mol), of $C_{12}$-$C_{18}$-alkylsulfonic acids, of $C_{12}$-$C_{18}$ sulfo fatty acid alkyl esters, for example of $C_{12}$-$C_{18}$ sulfo fatty acid methyl esters, of $C_{10}$-$C_{18}$-alkylarylsulfonic acids, preferably of n-$C_{10}$-$C_{18}$-alkylbenzene sulfonic acids, of $C_{10}$-$C_{18}$ alkyl alkoxy carboxylates and of soaps such as for example $C_8$-$C_{24}$-carboxylic acids. Preference is given to the alkali metal salts of the aforementioned compounds, particularly preferably the sodium salts.

In one embodiment of the present invention, anionic surfactants (B) are selected from n-$C_{10}$-$C_{18}$-alkylbenzene sulfonic acids and from fatty alcohol polyether sulfates, which, within the context of the present invention, are in particular sulfuric acid half-esters of ethoxylated $C_{12}$-$C_{18}$-alkanols (ethoxylation: 1 to 50 mol of ethylene oxide/mol), preferably of n-$C_{12}$-$C_{18}$-alkanols.

Compositions according to the invention may comprise at least one builder (C). In the context of the present invention, no distinction will be made between builders and such components elsewhere called "co-builders". Examples of builders (C) are complexing agents, hereinafter also referred to as complexing agents (C), ion exchange compounds, and precipitating agents (C). Builders are selected from citrate, phosphates, silicates, carbonates, phosphonates, amino carboxylates and polycarboxylates.

In the context of the present invention, the term citrate includes the mono- and the dialkali metal salts and in particular the mono- and preferably the trisodium salt of citric acid, ammonium or substituted ammonium salts of citric acid as well as citric acid. Citrate can be used as the anhydrous compound or as the hydrate, for example as sodium citrate dihydrate. Quantities of citrate are calculated referring to anhydrous trisodium citrate.

The term phosphate includes sodium metaphosphate, sodium orthophosphate, sodium hydrogenphosphate, sodium pyrophosphate and polyphosphates such as sodium tripolyphosphate. Preferably, however, the composition according to the invention is free from phosphates and polyphosphates, with hydrogenphosphates being subsumed, for example free from trisodium phosphate, pentasodium tripolyphosphate and hexasodium metaphosphate ("phosphate-free"). In connection with phosphates and polyphosphates, "free from" should be understood within the context of the present invention as meaning that the content of phosphate and polyphosphate is in total in the range from 10 ppm to 0.2% by weight of the respective composition, determined by gravimetry.

The term carbonates includes alkali metal carbonates and alkali metal hydrogen carbonates, preferred are the sodium salts. Particularly preferred is $Na_2CO_3$.

Examples of phosphonates are hydroxyalkanephosphonates and aminoalkanephosphonates. Among the hydroxyalkanephosphonates, the 1-hydroxyethane-1,1-diphosphonate (HEDP) is of particular importance as builder. It is preferably used as sodium salt, the disodium salt being neutral and the tetrasodium salt being alkaline (pH 9). Suitable aminoalkanephosphonates are preferably ethylenediaminetetramethylenephosphonate (EDTMP), diethylentriamine-pentamethylenphosphonate (DTPMP), and also their higher homologues. They are preferably used in the form of the neutrally reacting sodium salts, e.g. as hexasodium salt of EDTMP or as hepta- and octa-sodium salts of DTPMP.

Examples of amino carboxylates and polycarboxylates are nitrilotriacetates, ethylene diamine tetraacetate, diethylene triamine pentaacetate, triethylene tetraamine hexaacetate, propylene diamines tetraacetic acid, ethanol-diglycines, methylglycine diacetate, and glutamine diacetate. The term amino carboxylates and polycarboxylates also include their respective non-substituted or substituted ammonium salts and the alkali metal salts such as the sodium salts, in particular of the respective fully neutralized compound.

Silicates in the context of the present invention include in particular sodium disilicate and sodium metasilicate, alumosilicates such as for example zeolites and sheet silicates, in particular those of the formula $\alpha$-$Na_2Si_2O_5$, $\beta$-$Na_2Si_2O_5$, and O—$Na_2Si_2O_5$.

Compositions according to the invention may contain one or more builder selected from materials not being mentioned above. Examples of builders are $\alpha$-hydroxypropionic acid and oxidized starch.

In one embodiment of the present invention, builder (C) is selected from polycarboxylates. The term "polycarboxylates" includes non-polymeric polycarboxylates such as succinic acid, $C_2$-$C_{16}$-alkyl disuccinates, $C_2$-$C_{16}$-alkenyl disuccinates, ethylene diamine N,N'-disuccinic acid, tartaric acid diacetate, alkali metal malonates, tartaric acid monoacetate, propanetricarboxylic acid, butanetetracarboxylic acid and cyclopentanetetracarboxylic acid.

Oligomeric or polymeric polycarboxylates are for example polyaspartic acid or in particular alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_n$ in the range from 2000 to 40 000 g/mol, preferably 2000 to 10 000 g/mol, in particular 3000 to 8000 g/mol.

Further suitable copolymeric polycarboxylates are in particular those of acrylic acid with methacrylic acid and of acrylic acid or methacrylic acid with maleic acid and/or fumaric acid.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilically or hydrophobically modified comonomer as listed below.

Suitable hydrophobic comonomers are, for example, isobutene, diisobutene, butene, pentene, hexene and styrene, olefins with ten or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene having on average 12 to 100 carbon atoms per molecule.

Suitable hydrophilic comonomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. Polyalkylene glycols here can comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, meth-allyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, amphoteric polymers can also be used as builders.

Compositions according to the invention can comprise, for example, in the range from in total 0.1 to 70% by weight, preferably 10 to 50% by weight, preferably up to 20% by weight, of builder(s) (C), especially in the case of solid formulations. Liquid formulations according to the invention preferably comprise in the range of from 0.1 to 8% by weight of builder (C).

Formulations according to the invention can comprise one or more alkali carriers. Alkali carriers ensure, for example, a pH of at least 9 if an alkaline pH is desired. Of suitability are, for example, the alkali metal carbonates, the alkali metal hydrogen carbonates, and alkali metal metasilicates mentioned above, and, additionally, alkali metal hydroxides. A preferred alkali metal is in each case potassium, particular preference being given to sodium.

In one embodiment of the present invention, the laundry formulation according to the invention comprises additionally at least one enzyme (D).

Useful enzymes are, for example, one or more lipases, hydrolases, amylases, proteases, cellulases, hemicellulases, phospholipases, esterases, pectinases, lactases and peroxidases, and combinations of at least two of the foregoing types.

Enzyme (D) can be incorporated at levels sufficient to provide an effective amount for cleaning. The preferred amount is in the range from 0.001% to 5% of active enzyme by weight in the detergent composition according to the invention. Together with enzymes also enzyme stabilizing systems may be used such as for example calcium ions, boric acid, boronic acid, propylene glycol and short chain carboxylic acids. In the context of the present invention, short chain carboxylic acids are selected from monocarboxylic acids with 1 to 3 carbon atoms per molecule and from dicarboxylic acids with 2 to 6 carbon atoms per molecule.

Preferred examples are formic acid, acetic acid, propionic acid, oxalic acid, succinic acid, HOOC(CH$_2$)$_3$COOH, adipic acid and mixtures from at least two of the foregoing, as well as the respective sodium and potassium salts.

Compositions according to the invention may comprise one or more bleaching agent (E) (bleaches).

Preferred bleaches (E) are selected from sodium perborate, anhydrous or, for example, as the monohydrate or as the tetrahydrate or so-called dihydrate, sodium percarbonate, anhydrous or, for example, as the monohydrate, and sodium persulfate, where the term "persulfate" in each case includes the salt of the peracid H$_2$SO$_5$ and also the peroxodisulfate.

In this connection, the alkali metal salts can in each case also be alkali metal hydrogen carbonate, alkali metal hydrogen perborate and alkali metal hydrogen persulfate. However, the dialkali metal salts are preferred in each case.

Formulations according to the invention can comprise one or more bleach catalysts. Bleach catalysts can be selected from oxaziridinium-based bleach catalysts, bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Formulations according to the invention can comprise one or more bleach activators, for example tetraacetyl ethylene diamine, tetraacetylmethylenediamine, tetraacetylglycoluril, tetraacetylhexylenediamine, acylated phenolsulfonates such as for example n-nonanoyl- or isononanoyloxybenzene sulfonates, N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Formulations according to the invention can comprise one or more corrosion inhibitors (F). In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, formulations according to the invention comprise in total in the range from 0.1 to 1.5% by weight of corrosion inhibitor.

Formulations according to the invention may also comprise further cleaning polymers (G) or soil release polymers (H). The additional cleaning polymers (G) may include, without limitation, multifunctional polyethyleneimines (for example BASF's Sokalan® HP20) and/or multifunctional diamines (for example BASF's Sokalan® HP96).

Laundry formulations comprising the inventive amphoterically-modified oligopropyleneimine ethoxylates (A) may also comprise at least one antimicrobial agent (I).

The antimicrobial agent may be selected from the list consisting of 2-phenoxyethanol (CAS-no. 122-99-6, for example Protector) PE available from BASF) and 4,4'-dichloro-2-hydroxydiphenylether (CAS: 3380-30-1), and combinations thereof.

The 4,4'-dichloro-2-hydroxydiphenylether may be used as a solution, for example a solution of 30 wt % of 4,4'-dichloro-2-hydroxydiphenylether in 1,2-propyleneglycol, e.g. Tinosan® HP 100 available from BASF.

The inventive laundry formulation may comprise at least one antimicrobial agent from the above list and/or a combination thereof, and/or a combination with at least one further antimicrobial agent not listed here.

The antimicrobial agent may be added to the inventive laundry formulation in a concentration of 0.0001 to 10% relative to the total weight of the polymer.

Preferably, the formulation contains 2-Phenoxyethanol in a concentration of 0.01% to 5%, more preferably 0.1% to 2% and/or 4,4'-dichloro 2-hydroxydiphenyl ether in a concentration of 0.001% to 1%, more preferably 0.002% to 0.6% (in all cases relative to the total weight of the polymer).

Formulations according to the invention may comprise at least one additional surfactant, selected from non-ionic surfactants and amphoteric surfactants.

Non-Ionic Surfactants

Examples of (additional) surfactants are in particular nonionic surfactants. Preferred nonionic surfactants are alkoxylated alcohols and alkoxylated fatty alcohols, di- and multiblock copolymers of ethylene oxide and propylene oxide and reaction products of sorbitan with ethylene oxide or propylene oxide, furthermore alkylphenol ethoxylates, alkyl glycosides, polyhydroxy fatty acid amides (glucamides) and so-called amine oxides.

Preferred examples of alkoxylated alcohols and alkoxylated fatty alcohols are, for example, compounds of the general formula (III)

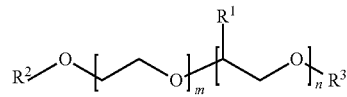

(III)

in which the variables are defined as follows:
R$^1$ is selected from linear C$_1$-C$_{10}$-alkyl, preferably ethyl and particularly preferably methyl,
R$^2$ is selected from C$_8$-C$_{22}$-alkyl, for example n-C$_8$H$_{17}$, n-C$_{10}$H$_{21}$, n-C$_{12}$H$_{25}$, n-C$_{14}$H$_{29}$, n-C$_{16}$H$_{33}$ or n-C$_{18}$H$_{37}$,
R$^3$ is selected from C$_1$-C$_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl,
m and n are in the range from zero to 300, where the sum of n and m is at least one. Preferably, m is in the range from 1 to 100 and n is in the range from 0 to 30.

Here, compounds of the general formula (III) may be block copolymers or random copolymers, preference being given to block copolymers.

Other preferred examples of alkoxylated alcohols and alkoxylated fatty alcohols are, for example, compounds of the general formula (IV)

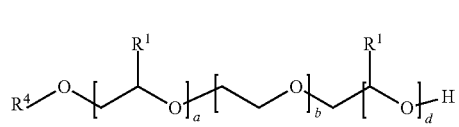

(IV)

in which the variables are defined as follows:
R$^1$ is identical or different and selected from linear C$_1$-C$_4$-alkyl, preferably identical in each case and ethyl and particularly preferably methyl, $R^4$ is selected from $C_6$-$C_{20}$-alkyl, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$, a is a number in the range from zero to 6, preferably 1 to 6,
b is a number in the range from zero to 20, preferably 4 to 20,
d is a number in the range from 4 to 25.

Preferably, at least one of a and b is greater than zero.

Here, compounds of the general formula (IV) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides such as lauryl dimethyl amine oxide ("lauramine oxide") or alkylphenol ethoxylates or alkyl polyglycosides or polyhydroxy fatty acid amides (gluc-amides) are likewise suitable. An overview of suitable further nonionic surfactants can be found in EP-A 0 851 023 and in DE-A 198 19 187.

Mixtures of two or more different nonionic surfactants may also be present.

Examples of amphoteric surfactants are $C_{12}$-$C_{18}$-alkyl-betaines and sulfobetaines.

Formulations according to the invention may also comprise water and additional organic solvents, e.g. ethanol or propylene glycol.

Further optional ingredients may be but are not limited to viscosity modifiers, cationic surfactants, foam boosting or foam reducing agents, perfumes, dyes, optical brighteners, and dye transfer inhibiting agents.

EXAMPLES

In the following paragraphs, several experimental examples are given in order to illustrate some aspects of the present invention.

Synthesis of Inventive and Comparative Examples

Synthesis of Oligoamines

Synthesis of Bis-(3,3'-aminopropyl)amine (Dipropylenetriamine, DPTA)

Acrylonitrile (7.8 kg, 0.15 kmol, 1.0 equiv.) was dropwise introduced to an excess of 1,3-diaminopropane (27.0 kg, 0.36 kmol, 2.5 equiv.) in a reaction vessel at 60° C. and kept under 65° C. After complete addition reaction, the reaction was stirred for 2 hours at 60° C. and then cooled to room temperature. The crude mixture was next analyzed via GC chromatography and was found to give a distribution of 45% (GC area-%) unreacted starting material, 47% (GC area-%) desired monocyanoethylated compound and 7% (GC area-%) dicyanoethylated compound (34.8 kg). Subsequently and without any further purification, the above-mentioned crude mixture was subjected to a hydrogenation in a fixed bed pressure reactor catalyzed by a [Co]-catalyst at 90° C. and 200 bar hydrogen pressure alongside with ammonia (28-45 equiv.). The crude oligoamine mixture was subjected to a fractional distillation under reduced pressure (140 to 20 mbar) and at elevated temperatures (120-220° C. column temperature) to give DPTA (134° C.; 20 mbar; purity >99%) as a colorless liquid.

GC-Analysis (30 m RTX5 Amin column; injection temperature at 60° C. then heated with 10° C./min to 280° C.): $R_t$=11.39 min (DPTA) and $R_t$=17.25 min (TPTA).

$^1$H-NMR (500 MHz, CDCl$_3$): δ=2.75 (m, 8H), 1.59 (m, 4H), 1.09 (bs, 5H) ppm.

$^{13}$C-NMR (125 MHz, CDCl$_3$): δ=40.0, 39.9, 39.7, 37.6, 37.4, 37.3 ppm.

Synthesis of Bis-(3,3'-aminopropyl)-1,3-propylenediamine (Tripropylenetetramine, TPTA)

Acrylonitrile (795 g, 15.0 mol, 2.05 equiv.) was dropwise introduced to 1,3-diaminopropane (542 g, 7.3 mol, 1.0 equiv.) in a reaction vessel at 13° C. within 4 hours and kept below 15° C. After complete addition reaction, the reaction was stirred for another 2 h at 15° C. and then warmed to room temperature. Subsequently and without any further purification, the above-mentioned crude mixture was subjected to a hydrogenation in a batch pressure reactor catalyzed by a Raney-Ni-catalyst (5 wt %) at 100° C. and 200 bar hydrogen pressure and stirred for 12 hours. After complete reaction, the reaction was quenched by purging the reaction vessel with nitrogen, the catalyst was removed by filtration and volatiles were removed under reduced pressure. The desired target compound was obtained after distillation under reduced pressure (3 mbar) and at elevated temperatures (170° C. column temperature) and gave TPTA (130° C.; 3 mbar; >99% purity) as a colorless liquid.

GC-Analysis (30 m RTX5 Amin column; injection temperature at 60° C. then heated with 10° C./min to 280° C.): $R_t$=17.25 min (TPTA).

$^1$H-NMR (500 MHz, MeOD): δ=4.6 (m, 6H), 2.7-2.6 (m, 12H), 1.7-1.6 (bs, 6H) ppm.

$^{13}$C-NMR (125 MHz, MeOD): δ=49.1, 48.9, 48.8, 48.7, 48.5, 48.3, 40.6, 33.6, 30.1 ppm.

Synthesis of Tris-(3,3',3"-aminopropyl)-1,3-propyl-enediamine (Tetrapropylenepentamine, TPPA)

Acrylonitrile (339 g, 6.4 mol, 2.0 equiv.) was dropwise introduced within 3 hours to a mixture of tripropylenetetramine (TPTA, 598 g, 3.2 mol, 1.0 equiv.) in THF (750 mL) in a reaction vessel at 50° C. After complete addition reaction, the reaction was stirred for another 2 hours at 50° C. and then cooled to room temperature. Subsequently and without any further purification, the above-mentioned crude mixture was subjected to a hydrogenation in a batch pressure reactor catalyzed by a Raney-Co-catalyst (5 wt %) in THF at 120° C. and 100 bar hydrogen pressure and stirred for 8 hours. After complete reaction, the reaction was quenched by purging the reaction vessel with nitrogen, the catalyst was removed by filtration and the solvent was removed under reduced pressure. The desired target compound was obtained next to pentapropylenehexamine (PPHA) after distillation under reduced pressure (2 mbar) and at elevated temperatures (270° C. column temperature) and gave TPPA (147° C.; 2 mbar; 93% purity) as a yellow oil.

GC-Analysis (30 m RTX5 Amin column; injection temperature at 80° C. then heated with 15° C./min to 280° C.): $R_t$=20.23 min (TPPA).

Polymer P1 (Inventive)

96.03 g dipropylene triamine (DPTA, 0.83 mol, 1 equiv.) and 10 g water are charged to a steel pressure reactor. The reactor is purged with nitrogen to remove air and a nitrogen pressure of 1 bar is set. The reactor is heated to 100° C. and 130 g of ethylene oxide (2.95 mol, 3.56 equiv.) are dosed into the reactor within seven hours. After that, the reaction mixture is kept at 100° C. for post reaction. Volatile compounds are removed under vacuum and 221.5 g of a clear and highly viscous product is removed from the reactor.

39.8 g of the previously obtained product are filled into a steel pressure reactor and 2.4 g of potassium hydroxide (50% aqueous solution) are added. Water is removed under reduced pressure. The reactor is purged with nitrogen to remove air and a nitrogen pressure of 1 bar is set. The reactor is heated to 120° C. and 548 g of ethylene oxide (12.4 mol, 99.7 equiv.) are added within six hours. Volatile compounds are removed under vacuum and 589 g of a brown solid were obtained.

200 g of the obtained ethoxylate (0.044 mol, 1 equiv.) are heated to 60° C. and filled into a glass reactor under nitrogen atmosphere. 16.2 g dimethyl sulfate (0.13 mol, 2.9 equiv.) are dosed into the reactor in such a manner that 1 ml of DMS is added per minute. Upon addition the temperature increases to 70° C. After completion of the addition, the mixture is allowed to post-react at 70° C. for two hours. 3.6 g of sulfuric acid (0.036 mol, 0.9 eq) are added to the reactor and the temperature is increased to 90° C. and the reactor is set under vacuum (15 mbar) for three hours. After completion of the reaction, 5.4 g of sodium hydroxide (50% aqueous solution) and 40 g of demineralized water are added, and the orange liquid product is removed from the reactor.

Polymer P2 (Inventive)

297.9 g tripropylene tetraamine (TPTA, 1.58 mol, 1 equiv.) and 29.8 g water are charged to a steel pressure reactor. The reactor is purged with nitrogen to remove air and a nitrogen pressure of 2.5 bar is set. The reactor is heated to 100° C. and 335 g of ethylene oxide (7.61 mol, 4.81 equiv.) are dosed into the reactor within ten hours. After that, the reaction mixture is kept at 100° C. for six hours for post reaction. Volatile compounds are removed under vacuum and 626.4 g of a clear and highly viscous product is removed from the reactor.

100 g of the previously obtained product are filled into a steel pressure reactor and 5.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 1270 g of ethylene oxide (28.8 mol, 115.2 equiv.) are added within 16 hours. Volatile compounds are removed under vacuum and 1374.2 g of a brown solid were obtained.

705.1 g of the obtained ethoxylate (0.13 mol, 1 equiv.) are heated to 60° C. and filled into a glass reactor under nitrogen atmosphere. 62.1 g dimethyl sulfate (0.49 mol, 3.8 equiv.) are dosed into the reactor in such a manner that 1 ml of DMS is added per minute. Upon addition the temperature increases to 70° C. After completion of the addition, the mixture is allowed to post-react at 70° C. for two hours. 8.0 g of sulfuric acid (0.08 mol, 0.6 eq) are added to the reactor, the temperature is increased to 90° C. and the reactor is set under vacuum (15 mbar) for three hours. After completion of the reaction, 11.0 g of sodium hydroxide (50% aqueous solution) and 650 g of demineralized water are added, and the orange liquid product is removed from the reactor.

Polymer P3 (Inventive)

138.9 g tripropylene tetraamine (TPTA, 0.74 mol, 1 equiv.) and 13.9 g water are charged to a steel pressure reactor. The reactor is purged with nitrogen to remove air and a nitrogen pressure of 1 bar is set. The reactor is heated to 100° C. and 156 g of ethylene oxide (3.54 mol, 4.81 equiv.) are dosed into the reactor within ten hours. After that, the reaction mixture is kept at 100° C. for five hours for post reaction. Volatile compounds are removed under vacuum and 290 g of a clear and highly viscous product is removed from the reactor.

63 g of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 1 bar is set. The reactor is heated to 120° C. and 696 g of ethylene oxide (15.8 mol, 100.3 equiv.) are added within 10 hours. Volatile compounds are removed under vacuum and 754.8 g of a brown solid were obtained.

556 g of the obtained ethoxylate (0.12 mol, 1 equiv.) are heated to 60° C. and filled into a glass reactor under nitrogen atmosphere. 57.4 g dimethyl sulfate (0.49 mol, 3.8 equiv.) are dosed into the reactor in such a manner that 1 ml of DMS is added per minute. Upon addition the temperature increases to 70° C. After completion of the addition, the mixture is allowed to post-react at 70° C. for two hours. 7.0 g of sulfuric acid (0.07 mol, 0.6 eq) are added to the reactor, the temperature is increased to 90° C. and the reactor is set under vacuum (15 mbar) for three hours. After completion of the reaction, 10.0 g of sodium hydroxide (50% aqueous solution) and 500 g of demineralized water are added, and the orange liquid product is removed from the reactor.

Polymer P4 (Inventive)

173.8 g tripropylene tetraamine (TPTA, 0.92 mol, 1 equiv.) and 17.3 g water are charged to a steel pressure reactor. The reactor is purged with nitrogen to remove air and a nitrogen pressure of 2.5 bar is set. The reactor is heated to 100° C. and 195 g of ethylene oxide (4.43 mol, 4.81 equiv.) are dosed into the reactor within ten hours. After that, the reaction mixture is kept at 100° C. for six hours for post reaction. Volatile compounds are removed under vacuum and 366.8 g of a clear and highly viscous product is removed from the reactor.

60 g of the previously obtained product are filled into a steel pressure reactor and 4.9 g of potassium hydroxide (50% aqueous solution) are added. Water is removed under reduced pressure. The reactor is purged with nitrogen to remove air and a nitrogen pressure of 1 bar is set. The reactor is heated to 120° C. and 1159 g of ethylene oxide (26.2 mol, 174.6 equiv.) are added within 15 hours. Volatile compounds are removed under vacuum and 1233 g of a brown solid were obtained.

488.1 g of the obtained ethoxylate (0.06 mol, 1 equiv.) are heated to 60° C. and filled into a glass reactor under nitrogen atmosphere. 29.3 g dimethyl sulfate (0.23 mol, 3.87 equiv.) are dosed into the reactor in such a manner that 1 ml of DMS is added per minute. Upon addition the temperature increases to 70° C. After completion of the addition, the mixture is allowed to post-react at 70° C. for two hours. 6.7 g of sulfuric acid (0.07 mol, 0.6 eq) are added to the reactor, the temperature is increased to 90° C. and the reactor is set under vacuum (15 mbar) for three hours. After completion of the reaction, 8.5 g of sodium hydroxide (50% aqueous solution) and 488.1 g of demineralized water are added, and the orange liquid product is removed from the reactor.

Polymer P5 (Inventive)

83.3 g tripropylene tetraamine (TPTA, 0.44 mol, 1 equiv.) and 8.3 g water are charged to a steel pressure reactor. The reactor is purged with nitrogen to remove air and a nitrogen pressure of 2.5 bar is set. The reactor is heated to 120° C. and 93.5 g of ethylene oxide (2.12 mol, 4.83 equiv.) are dosed into the reactor in such a way that the internal pressure does not exceed 5.5 bar. After that, the reaction mixture is kept at 120° C. for six hours for post reaction. 9.1 g of potassium hydroxide (50% aqueous solution) are added and water is removed under reduced pressure. The reactor is purged with nitrogen to remove air and a nitrogen pressure of 2.5 bar is set. The reactor is heated to 140° C. and 844 g of ethylene oxide (19.2 mol, 43.6 equiv.) are added in such a way that the internal pressure does not exceed 5.5 bar. The mixture is allowed to post-react for 6 hours. Volatile compounds are removed under vacuum and 952.2 g of a brown viscous liquid were obtained.

494 g of the previously obtained alkoxylate is charges into a steel pressure reactor, inertized with nitrogen, heated to 140° C. A pre-pressure of nitrogen of 2.5 bar is set and 667.4 g ethylene oxide (15.15 mol, 34.4 equiv.) are added to the reactor in such a way that the internal pressure remained below 5.5 bar. The mixture is allowed to post-react for six hours. Volatile compounds are removed in vacuo and 1060.8 g of a brown solid was obtained as product.

326.3 g of the obtained ethoxylate (0.06 mol, 1 equiv.) are heated to 60° C. and filled into a glass reactor under nitrogen atmosphere. 29.9 g dimethyl sulfate (0.24 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. 4.0 g of sulfuric acid (0.04 mol, 0.68 eq) are added to the reactor, the temperature is increased to 90° C. and the reactor is set under vacuum (15 mbar) for three hours. After completion of the reaction, 9.14 g of triethanolamine and 143.1 g of demineralized water are added, and the orange liquid product is removed from the reactor.

Polymer P6 (Inventive)

62.9 g tetrapropylene pentaamine (TPPA, 0.26 mol, 1 equiv.) and 6.3 g water are charged to a steel pressure reactor. The reactor is purged with nitrogen to remove air and a nitrogen pressure of 3.5 bar is set. The reactor is heated to 100° C. and 60 g of ethylene oxide (1.36 mol, 5.2 equiv.) are dosed into the reactor within seven hours. After that, the reaction mixture is kept at 100° C. for post reaction. Volatile compounds are removed under vacuum and 6.2 g of potassium hydroxide (50% aqueous solution) are added. Water is removed under reduced pressure. The reactor is purged with nitrogen to remove air and a nitrogen pressure of 1.5 bar is set. The reactor is heated to 120° C. and 1435 g of ethylene oxide (32.575 mol, 125 equiv.) are added within 12 hours. Volatile compounds are removed under vacuum and 1589.2 g of a brown solid were obtained.

314.2 g of the obtained ethoxylate (0.05 mol, 1 equiv.) are heated to 60° C. and filled into a glass reactor under nitrogen atmosphere. 31.4 g dimethyl sulfate (0.25 mol, 4.9 equiv.) are dosed into the reactor in such a manner that 1 ml of DMS is added per minute. Upon addition the temperature increases to 70° C. After completion of the addition, the mixture is allowed to post-react at 70° C. for two hours. 3.5 g of sulfuric acid (0.036 mol, 0.7 eq) are added to the reactor, the temperature is increased to 90° C. and the reactor is set under vacuum (15 mbar) for three hours. After completion of the reaction, 5.0 g of sodium hydroxide (50% aqueous solution) and 300 g of demineralized water are added, and the orange liquid product is removed from the reactor.

COMPARATIVE EXAMPLES

Polymer CP1 (Comparative)

297.9 g tripropylene tetraamine (TPTA, 1.58 mol, 1 equiv.) and 29.8 g water are charged to a steel pressure reactor. The reactor is purged with nitrogen to remove air and a nitrogen pressure of 2.5 bar is set. The reactor is heated to 100° C. and 335 g of ethylene oxide (7.61 mol, 4.81 equiv.) are dosed into the reactor within ten hours. After that, the reaction mixture is kept at 100° C. for six hours for post reaction. Volatile compounds are removed under vacuum and 626.4 g of a clear and highly viscous product is removed from the reactor.

100 g of the previously obtained product are filled into a steel pressure reactor and 5.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 1270 g of ethylene oxide (28.8 mol, 115.2 equiv.) are added within 16 hours. Volatile compounds are removed under vacuum and 1374.2 g of a brown solid were obtained.

Polymer CP2 (Comparative)

99.1 g tripropylene tetraamine (TPTA, 0.53 mol, 1 equiv.) and 9.9 g water are charged to a steel pressure reactor. The reactor is purged with nitrogen to remove air and a nitrogen pressure of 1.0 bar is set. The reactor is heated to 100° C. and 112 g of ethylene oxide (2.54 mol, 4.83 equiv.) are dosed into the reactor within six hours. After that, the reaction mixture is kept at 100° C. for six hours for post reaction. Volatile compounds are removed under vacuum and 210 g of a clear and highly viscous product is removed from the reactor.

39.2 g of the previously obtained product are filled into a steel pressure reactor and 1.1 g of potassium hydroxide (50% aqueous solution) are added. Water is removed under reduced pressure. The reactor is purged with nitrogen to remove air and a nitrogen pressure of 1 bar is set. The reactor is heated to 120° C. and 498 g of ethylene oxide (11.3 mol, 115.2 equiv.) are added within 10 hours. Volatile compounds are removed under vacuum and 536 g of a brown solid were obtained.

115 g of the obtained ethoxylate (0.02 mol, 1 equiv.) are heated to 60° C. and filled into a glass reactor under nitrogen atmosphere. 10.3 g dimethyl sulfate (0.08 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. Sodium hydroxide (50% aqueous solution) is added to set the pH to 8.2 The product is obtained as light brown solid.

Polymer CP3 (Comparative)

500 g polypropyleneimine and 17 g water are charged to a steel pressure reactor. The reactor is purged with nitrogen to remove air and a nitrogen pressure of 2.5 bar is set. The reactor is heated to 120° C. and 348 g of ethylene oxide are dosed into the reactor within six hours. After that, the reaction mixture is kept at 120° C. for six hours for post reaction. Volatile compounds are removed under vacuum and 825 g of a yellow and highly viscous product is removed from the reactor.

90 g of the previously obtained product are filled into a steel pressure reactor and 3.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 783 g of ethylene oxide (17.8 mol) are added within 16 hours. Volatile compounds are removed under vacuum and 875 g of a brown solid were obtained.

Polymer CP4 (Comparative)

500 g polypropyleneimine and 17 g water are charged to a steel pressure reactor. The reactor is purged with nitrogen to remove air and a nitrogen pressure of 2.5 bar is set. The reactor is heated to 120° C. and 348 g of ethylene oxide are dosed into the reactor within six hours. After that, the reaction mixture is kept at 120° C. for six hours for post reaction. Volatile compounds are removed under vacuum and 825 g of a yellow and highly viscous product is removed from the reactor.

90 g of the previously obtained product are filled into a steel pressure reactor and 3.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 783 g of ethylene oxide (17.8 mol) are added within 16 hours. Volatile compounds are removed under vacuum and 875 g of a brown solid were obtained.

78.1 g of the obtained ethoxylate are heated to 60° C. and filled into a glass reactor under nitrogen atmosphere. 6.6 g dimethyl sulfate (0.05 mol) are dosed into the reactor in such a manner that 1 ml of DMS is added per minute. Upon addition the temperature increases to 70° C. After completion of the addition, the mixture is allowed to post-react at 70° C. for two hours and neutralized with 5.4 g sodium hydroxide (50% aqueous solution) and 82.2 g of a brown solid was obtained.

33.0 g of the brown solid was heated to 60° C. and 1.2 g of sulfuric acid are added to the reactor, the temperature is increased to 90° C. and the reactor is set under vacuum (15 mbar) for three hours. After completion of the reaction, 2.7 g of sodium hydroxide (50% aqueous solution) is added. The product is obtained as brown solid.

Polymer CP5 (Comparative)

98.9 g 1,3-propylendiamine (1,3-PDA, 1.33 mol, 1 equiv.) and 9.9 g water are charged to a steel pressure reactor. The reactor is purged with nitrogen to remove air and a nitrogen pressure of 1.0 bar is set. The reactor is heated to 100° C. and 189 g of ethylene oxide (4.29 mol, 3.23 equiv.) are dosed into the reactor within six hours. After that, the reaction mixture is kept at 100° C. for six hours for post reaction. Volatile compounds are removed under vacuum and 210 g of a clear and highly viscous product is removed from the reactor.

50.05 g of the previously obtained product are filled into a steel pressure reactor and 3.3 g of potassium hydroxide (50% aqueous solution) are added. Water is removed under reduced pressure. The reactor is purged with nitrogen to remove air and a nitrogen pressure of 1 bar is set. The reactor is heated to 120° C. and 788 g of ethylene oxide (17.9 mol, 76.9 equiv.) are added within 10 hours. Volatile compounds are removed under vacuum and 838.1 g of a brown solid were obtained.

200 g of the obtained ethoxylate (0.06 mol, 1 equiv.) are heated to 60° C. and filled into a glass reactor under nitrogen atmosphere. 13.8 g dimethyl sulfate (0.11 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 3.6 g of sulfuric acid (0.04 mol, 0.6 eq) are added to the reactor and the temperature is increased to 90° C. and the reactor is set under vacuum (15 mbar) for three hours. After completion of the reaction, 5.0 g of sodium hydroxide (50% aqueous solution) and 40 g of demineralized water are added, and the orange liquid product is removed from the reactor.

Polymer CP6 (Comparative)

364 g hexamethylenediamine (HMDA, 3.13 mol, 1 equiv.) and 36.4 g water are charged to a steel pressure reactor. The reactor is purged with nitrogen to remove air and a nitrogen pressure of 2.0 bar is set. The reactor is heated to 100° C. and 442 g of ethylene oxide (10.0 mol, 3.19 equiv.) are dosed into the reactor within six hours. After that, the reaction mixture is kept at 100° C. for six hours for post reaction. Volatile compounds are removed under vacuum and 795.2 g of a clear and highly viscous product is removed from the reactor.

80 g (0.43 mol, 1.0 eq) of the previously obtained product are filled into a steel pressure reactor and 3.3 g of potassium hydroxide (50% aqueous solution) are added. Water is removed under reduced pressure. The reactor is purged with nitrogen to remove air and a nitrogen pressure of 1 bar is set. The reactor is heated to 130° C. and 1053 g of ethylene oxide (23.9 mol, 55.7 equiv.) are added within 15 hours. Volatile compounds are removed under vacuum and 1149.4 g of a brown solid were obtained.

364 g of the obtained ethoxylate (0.1 mol, 1 equiv.) are heated to 60° C. and filled into a glass reactor under nitrogen atmosphere. 24.8 g dimethyl sulfate (0.20 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 3.4 g of sulfuric acid (0.03 mol, 0.3 eq) are added to the reactor and the temperature is increased to 90° C. and the reactor is set under vacuum (15 mbar) for three hours. After completion of the reaction, 3.27 g of sodium hydroxide (50% aqueous solution) and 384 g of demineralized water are added, and the liquid product is removed from the reactor.

Polymer CP7 (Comparative)

97.9 g ethylenediamine (EDA, 1.63 mol, 1 equiv.) and 9.7 g water are charged to a steel pressure reactor. The reactor is purged with nitrogen to remove air and a nitrogen pressure of 1.0 bar is set. The reactor is heated to 100° C. and 230 g of ethylene oxide (5.22 mol, 3.2 equiv.) are dosed into the reactor within six hours. After that, the reaction mixture is kept at 100° C. for six hours for post reaction. Volatile compounds are removed under vacuum and 327 g of a clear and highly viscous product is removed from the reactor.

42.6 g (0.21 mol, 1.0 eq) of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 1 bar is set. The reactor is heated to 130° C. and 717 g of ethylene oxide (16.3 mol, 77.5 equiv.) are added within 15 hours. Volatile compounds are removed under vacuum and 752.8 g of a brown solid were obtained.

200 g of the obtained ethoxylate (0.06 mol, 1 equiv.) are heated to 60° C. and filled into a glass reactor under nitrogen atmosphere. 13.9 g dimethyl sulfate (0.11 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 4.2 g of sulfuric acid (0.04 mol, 0.6 eq) are added to the reactor and the temperature is increased to 90° C. and the reactor is set under vacuum (15 mbar) for three hours. After completion of the reaction, 7.8 g of sodium hydroxide (50% aqueous solution) and 40 g of demineralized water are added, and the orange liquid product is removed from the reactor.

Polymer CP8 (Comparative)

96.7 g diethylenediamine (DETA, 0.94 mol, 1 equiv.) and 9.7 g water are charged to a steel pressure reactor. The reactor is purged with nitrogen to remove air and a nitrogen pressure of 1.0 bar is set. The reactor is heated to 100° C. and 136 g of ethylene oxide (3.08 mol, 3.3 equiv.) are dosed into the reactor within six hours. After that, the reaction mixture is kept at 100° C. for six hours for post reaction. Volatile compounds are removed under vacuum and 231 g of a clear and highly viscous product is removed from the reactor.

45.9 g (0.16 mol, 1.0 eq) of the previously obtained product are filled into a steel pressure reactor and 2.9 g of potassium hydroxide (50% aqueous solution) are added. Water is removed under reduced pressure. The reactor is purged with nitrogen to remove air and a nitrogen pressure of 1 bar is set. The reactor is heated to 130° C. and 696 g of ethylene oxide (15.8 mol, 98.8 equiv.) are added within 15 hours. Volatile compounds are removed under vacuum and 732.7 g of a brown solid were obtained.

200 g of the obtained ethoxylate (0.04 mol, 1 equiv.) are heated to 60° C. and filled into a glass reactor under nitrogen atmosphere. 16.5 g dimethyl sulfate (0.13 mol, 2.9 equiv.) are dosed into the reactor in such a manner that 1 ml of DMS is added per minute. Upon addition the temperature increases to 70° C. After completion of the addition, the mixture is allowed to post-react at 70° C. for two hours. 3.9 g of sulfuric acid (0.04 mol, 0.8 eq) are added to the reactor and the temperature is increased to 90° C. and the reactor is set under vacuum (15 mbar) for three hours. After completion of the reaction, 6.8 g of sodium hydroxide (50% aqueous solution) and 40 g of demineralized water are added, and the orange liquid product is removed from the reactor.

Polymer CP9 (Comparative)

233.6 g triethylenetetraamine (TETA, 1.60 mol, 1 equiv.) and 23.3 g water are charged to a steel pressure reactor. The reactor is purged with nitrogen to remove air and a nitrogen pressure of 1.0 bar is set. The reactor is heated to 100° C. and 338 g of ethylene oxide (7.67 mol, 4.8 equiv.) are dosed into the reactor within six hours. After that, the reaction mixture is kept at 100° C. for six hours for post reaction. Volatile compounds are removed under vacuum and 571 g of a clear and highly viscous product is removed from the reactor.

46.3 g (0.13 mol, 1.0 eq) of the previously obtained product are filled into a steel pressure reactor and 2.8 g of potassium hydroxide (50% aqueous solution) are added. Water is removed under reduced pressure. The reactor is purged with nitrogen to remove air and a nitrogen pressure of 1 bar is set. The reactor is heated to 130° C. and 658 g of ethylene oxide (14.9 mol, 114.9 equiv.) are added within 15 hours. Volatile compounds are removed under vacuum and 694 g of a brown solid were obtained.

200 g of the obtained ethoxylate (0.04 mol, 1 equiv.) are heated to 60° C. and filled into a glass reactor under nitrogen atmosphere. 17.4 g dimethyl sulfate (0.14 mol, 3.75 equiv.) are dosed into the reactor in such a manner that 1 ml of DMS is added per minute. Upon addition the temperature increases to 70° C. After completion of the addition, the mixture is allowed to post-react at 70° C. for two hours. 3.0 g of sulfuric acid (0.03 mol, 0.8 eq) are added to the reactor and the temperature is increased to 90° C. and the reactor is set under vacuum (15 mbar) for three hours. After completion of the reaction, 7.6 g of sodium hydroxide (50% aqueous solution) and 40 g of demineralized water are added, and the viscous liquid product is removed from the reactor.

Polymer CP10 (Comparative)

PEI600+20 EO/NH, synthesized as described in WO9532272 or U.S. Pat. No. 9,738,754.

Polymer CP11 (Comparative)

400 g tripropylentetraamine (TPTA, 2.12 mol, 1 equiv.) and 40 g water are charged to a steel pressure reactor. The reactor is purged with nitrogen to remove air and a nitrogen pressure of 2.5 bar is set. The reactor is heated to 100° C. and 450 g of ethylene oxide (10.22 mol, 4.8 equiv.) are dosed into the reactor within ten hours. After that, the reaction mixture is kept at 100° C. for six hours for post reaction. Volatile compounds are removed under vacuum and 945 g of a clear and highly viscous product is removed from the reactor.

50.0 g (0.13 mol, 1.0 equiv.) of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 2 bar is set. The reactor is heated to 130° C. and 337 g of ethylene oxide (7.65 mol, 61.1 equiv.) are added within six hours. The mixture is allowed to post-react for six hours. After that, 87 g of propylene oxide (1.50 mol, 12.0 equiv.) are dosed into the reactor within two hours. The mixture is allowed to post-react for six hours at 130° C. Subsequently, 264 g ethylene oxide (5.99 mol, 48.0 equiv.) are dosed into the reactor at 130° C. and the mixture is allowed to post-react for six hours. Volatile compounds are removed under vacuum and 755 g of a yellow viscous liquid were obtained.

451.6 g of the obtained ethoxylate (0.08 mol, 1 equiv.) are heated to 60° C. and filled into a glass reactor under nitrogen atmosphere. 39.1 g dimethyl sulfate (0.31 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. 5.80 g of sulfuric acid (0.06 mol, 0.7 eq) are added to the reactor and the temperature is increased to 90° C. and the reactor is set under vacuum (15 mbar) for three hours. After completion of the reaction, 7.9 g of sodium hydroxide (50% aqueous solution) and 440 g of demineralized water are added, and the orange liquid product is removed from the reactor.

Polymer CP12 (Comparative)

PEI2000+32.5 EO/NH, synthesized as described in WO2020/030469 (Polymer P.2):

A 2-liter autoclave was charged with 508.5 g of completely de-watered and O02-free PEI2000, according to the procedure described in US 2010/0216949. Then, the PEI2000 was brought to an 85% by weight solution in water, by addition of 89 g H2O. The vessel was purged 3 times with nitrogen pressure of up to 5 bar, and finally the vessel was made inert with a 2 bar pad of nitrogen. The temperature was equilibrated at 100° C. and subsequently 261 g of ethylene oxide were dosed over 6 hours and allowed to react further for 1 hour. The product, PEI2000+0.5EO/NH, was then purged with nitrogen to strip any residual EO, emptied from the reactor, and stripped of water and any residual EO. Of this material, 53.0 g were charged into a clean and empty 2-liter autoclave. 4.8 g 50 wt % KOH in water was then dosed and stirred with the PEI2000+0.5EO/NH. Subsequently, water was stripped out of the mixture at 120° C. for 2 hours at 10 mbar. The temperature was then increased to 130° C., the vessel was made inert with a 2 bar pad of nitrogen, and 1150 g of ethylene oxide were dosed over 12 hours, at a total pressure of approx. 3.5 bar (initial pressure) to approx. 8 bar (pressure at the end of the EO dosing), and allowed to post-react for at least 6 hours. The sample was then purged with nitrogen to strip any residual EO, emptied from the reactor, and stripped of water and any residual EO in vacuo (20 mbar, 90° C.). 1223 g of a light brownish yellow solid were obtained.

Characterization of Polymers

Molecular weights were determined by gel permeation chromatography (GPC). The conditions applied were hexafluoroisopropanol and 0.05% trifluoroacetic acid potassium salt were used as solvent. The column oven temperature was set to 35° C. and the flow rate was 1 mL/min. 50 µL of the sample was injected and the concentration of the samples was set to 1.5 mg/mL. The samples were filtered after dissolution of the polymer using a Millipore Millflex FG (0.2 µm) filter to avoid blocking of the column. The following columns were used: a HFIP Guard column (diameter: 8 mm, length 5 cm), a PL HFIP Gel column (separation material styrene-divinylbenzene, diameter: 7.5 mm, length: 30 cm) and a PL HFIPGel column (separation material styrene-divinylbenzene, diameter: 7.5 mm, length: 30 cm, exclusion size: 100-100000 g/mol). The GPC system was calibrated using PMMA standards in the molecular weight range between 800 and 2200000 g/mol. The eluate was detected using a refractive index (RI) detector (DRI Agilent 1000)

Analytical data of the inventive and the comparative polymers are summarized in Table 1.

CP.8 and CP.9: Polymers similar to the inventive polymers (i.e. based on oligopropyleneimines) but based on oligoethyleneimines CP.10: PEI ethoxylate, as described in EP112593 (application), WO9532272 or U.S. Pat. No. 9,738,754 (synthesis)

CP.11: Polymer containing mixed EO/PO alkoxylate chains, similar to structures described in EP3039109 and EP3039057

CP.12: PEI ethoxylate with high molecular weight, as described in WO2020/030469 (Polymer P.2)

Application Experiments

Primary Cleaning Performance

To determine the primary detergency, the cleaning performance on circular red pottery and yellow pottery stains on a polyester fabric (Warwick Equest, Consett, UK) was measured by determining the color difference (delta E) between the stains after wash and the unsoiled white fabric using a reflectometer (Datacolor SF600 plus). 4 circular red pottery and 4 yellow pottery stains were used in 1 experiment (i.e. 2 pieces of a polyester test fabric containing 2

TABLE 1

Composition and physicochemical characterization of inventive amphoterically-modified oligopropyleneimine ethoxylates and comparative polymers.

| Polymer | Amine starting material | Alkoxylation | Modification | Molecular weight Mw [g/mol] |
|---|---|---|---|---|
| P.1 | Dipropylenetriamine ("Dimer", DPTA) | 20 EO/NH | amphoteric | 2930 |
| P.2 | Tripropylenetetramine ("Trimer", TPTA) | 20 EO/NH | amphoteric | 4400 |
| P.3 | Tripropylenetetramine ("Trimer", TPTA) | 17.5 EO/NH | amphoteric | 3730 |
| P.4 | Tripropylenetetramine ("Trimer", TPTA) | 30 EO/NH | amphoteric | 7030 |
| P.5 | Tripropylenetetramine ("Trimer", TPTA) | 20 EO/NH | amphoteric | 4010 |
| P.6 | Tetrapropylenepentamine ("Tetramer", TPPA) | 20 EO/NH | amphoteric | 4450 |
| CP.1 | Tripropylenetetramine ("Trimer", TPTA) | 20 EO/NH | no modification | 5110 |
| CP.2 | Tripropylenetetramine ("Trimer", TPTA) | 20 EO/NH | cationic | 4510 |
| CP.3 | PPI (Polypropyleneimine, based on 1,3-PDA) Mn 349 g/mol; Mw 523 g/mol; PDI 1.5 | 20 EO/NH | no modification | 5390 |
| CP.4 | PPI (Polypropyleneimine, based on 1,3-PDA) Mn 349 g/mol; Mw 523 g/mol; PDI 1.5 | 20 EO/NH | amphoteric | 2860 |
| CP.5 | 1,3-Propylenediamine ("Monomer", PDA) | 20 EO/NH | amphoteric | 3360 |
| CP.6 | 1,6-Diaminohexane (HMDA) | 20 EO/NH | amphoteric | 3950 |
| CP.7 | Ethylenediamine (EDA) | 20 EO/NH | amphoteric | 3110 |
| CP.8 | Diethylenetriamine (DETA) | 20 EO/NH | amphoteric | 3380 |
| CP.9 | Triethylenetetramine (TETA) | 20 EO/NH | amphoteric | 4080 |
| CP.10 | PEI (Polyethyleneimine, based on Aziridine) Mw 600 g/mol | 20 EO/NH | no modification | 8820 |
| CP.11 | Tripropylenetetramine ("Trimer", TPTA) | 11 EO/NH + 2 PO/NH + 8 EO/NH | amphoteric | 3580 |
| CP.12 | PEI (Polyethyleneimine, based on Aziridine) Mw 2000 g/mol | 32.5 EO/NH | no modification | 42000 * |

* MALLS detector

CP.1 and CP.2: Polymers similar to the inventive polymers (i.e. based on oligopropyleneimines) but not amphoterically-modified CP.3 and CP.4: Polymers described in EP2961821

CP.6 (and similar polymers based on different diamines CP.5 and CP.7): Described in WO200424858 circular red pottery and 2 yellow pottery stains), each experiment was repeated 3 times, thus a total of 12 washed stains for both red pottery clay and yellow pottery clay per test condition were obtained to calculate the average delta E value. By using these delta E values, the so-called "standardized cleaning performance" (delta delta E) has been calculated. The "standardized cleaning performance" (delta delta E) is the difference of the performance of the laundry detergent including the respective amphoterically-modified oligopropyleneimine ethoxylate or comparative polymer, respectively, vs. the laundry detergent w/o any amphoterically-modified oligopropyleneimine ethoxylate or comparative polymer, respectively.

Table 2 shows the composition of the laundry detergents, Table 3 shows the washing test conditions and Table 4 summarizes the obtained standardized cleaning performance. The standardized cleaning performance shown in Table 4 is the sum of the standardized cleaning performance for red and yellow pottery clay. The bigger the sum of the delta delta E value, the bigger the positive contribution of the respective amphoterically-modified oligopropyleneimine ethoxylate or comparative polymer, respectively, on the cleaning performance.

TABLE 2

Composition of liquid laundry detergents.

| Ingredients | LLD.1 * |
|---|---|
| Linear $C_{12}C_{14}$-alkylbenzenesulfonic acid | 8.00 |
| $C_{12}$-fatty alcohol × 3 EO sulfate | 6.00 |
| $C_{12}C_{15}$-fatty alcohol × 7 EO | 6.00 |
| Mono propylene glycol (MPG) | 6.00 |
| Triethanolamine | 2.50 |
| Sodium hydroxide | 0.40 |
| Demin. water | add 100 |
| pH value | 7.4 |

* All data are wt % active ingredient, independent of the respective product form.

TABLE 3

Washing conditions for evaluation of primary detergency.

| Device | Linitest+ from SDL Atlas, Rock Hill, USA |
|---|---|
| Washing liquor | 200 mL |
| Washing time | 30 minutes |
| Washing temperature | 40° C. |
| Detergent concentration | 3.0 g/L |
| Water hardness (Ca:Mg:HCO3) | 1.2 mmol/L (4:2:3) (12° fH.) |
| Fabric to liquor ratio | 1:10 |
| Amphoterically-modified oligopropyleneimine ethoxylate or comparative polymer addition | 0.83% or 2.50% by weight (vs. liquid laundry detergent) of the polymer, 100% active ingredient |
| Test fabric * | 2 circular red pottery and 2 yellow pottery stains on a polyester fabric (Warwick Equest, Consett, UK) |
| Ballast fabric | Polyester and cotton ballast, to yield a 1:1 ratio of polyester/cotton fabric per experiment |

* After the washing experiment, the test fabrics were rinsed with 12° fH. water (2 times), followed by drying at ambient room temperature overnight, prior to the measurement with the reflectometer.

TABLE 4

Results from washing tests.

| Detergent | Polymer | Concentration of polymeric additive * | Standardized cleaning performance (sum delta delta E) ** |
|---|---|---|---|
| LLD.1 | P.1 | 0.83 wt % | 17.8 |
| LLD.1 | P.2 | 0.83 wt % | 23.3 |
| LLD.1 | P.3 | 0.83 wt % | 20.4 |
| LLD.1 | P.4 | 0.83 wt % | 21.1 |
| LLD.1 | P.5 | 0.83 wt % | 24.0 |
| LLD.1 | P.6 | 0.83 wt % | 22.9 |
| LLD.1 | CP.1 | 0.83 wt % | 7.4 |
| LLD.1 | CP.2 | 0.83 wt % | 16.3 |
| LLD.1 | CP.3 | 0.83 wt % | 13.6 |
| LLD.1 | CP.4 | 0.83 wt % | 2.8 |
| LLD.1 | CP.5 | 0.83 wt % | 11.4 |
| LLD.1 | CP.6 | 0.83 wt % | 8.5 |
| LLD.1 | CP.7 | 0.83 wt % | 11.1 |
| LLD.1 | CP.8 | 0.83 wt % | 14.7 |
| LLD.1 | CP.9 | 0.83 wt % | 9.8 |
| LLD.1 | CP.10 | 0.83 wt % | 6.5 |
| LLD.1 | CP.10 | 2.50 wt % | 9.1 |
| LLD.1 | CP.11 | 0.83 wt % | 22.5 |
| LLD.1 | CP.12 | 2.50 wt % | 6.9 |

* All data are wt % active ingredient, independent of the respective product form.
** The 95% confidence interval of the applied method for the sum of delta delta E is +/−1.5.

Note: The comparative polymers CP.10 and CP.12 (both based on a PEI core) are showing a significantly worse performance vs the inventive polymers, even at a three times higher concentration level. At a lower concentration level of 0.83 wt %, a significant cleaning performance has not been detectable at all for CP.12.

The results from the washing tests clearly demonstrate the superior performance of the inventive polymers vs the comparative polymers described in the state of the art. All comparative polymers except CP.2 and CP.11 exhibit a significantly worse performance than the inventive polymers. The comparative polymer CP.2 exhibits a directionally worse performance vs the polymers of the present invention if the 95% confidence interval of the applied method is considered.

Viscosity

To determine the influence of the polymers on the viscosity of the liquid laundry formulations, in each case 0.5% or 1.45% by weight of a amphoterically-modified oligopropyleneimine ethoxylate or comparative polymer, respectively, was formulated into the liquid detergent containing a fixed level of 0.85% by weight of a HASE thickening polymer (formulation F.1). The pH was adjusted with an aqueous 50 wt % solution of NaOH to pH 7.5. The formulations were stirred with a magnetic stirrer for 2 hours and subsequently stored for another 24 hours w/o mechanical agitation. The viscosities of the samples were then measured using a rotational rheometer Rheolab QC (Anton Paar, Ostfildern, Germany), with spindle CC27, at room temperature (23° C.). The measurement was conducted from 0 to 1200 1/s shear rate.

Table 5 shows the composition of the final formulations, Table 6 summarizes the obtained viscosities at a shear rate of 20 1/s.

TABLE 5

Composition of liquid laundry formulations.

| Ingredients | F.1 [wt %] * |
|---|---|
| Linear $C_{12}C_{14}$-alkylbenzenesulfonic acid | 2.72 |
| $C_{12}$-fatty alcohol × 3 EO sulfate | 2.04 |

TABLE 5-continued

Composition of liquid laundry formulations.

| Ingredients | F.1 [wt %] * |
|---|---|
| $C_{12}C_{15}$-fatty alcohol × 7 EO | 2.04 |
| $C_{12}$-$C_{18}$ fatty acid | 0.40 |
| HASE thickening polymer | 0.85 |
| 1-Hydroxyethane-1,1-diphosphonic acid (HEDP) | 0.70 |
| Triethanolamine | 3.52 |
| Fragrance | 0.65 |
| Preservative | 0.03 |
| Amphoterically-modified oligopropyleneimine ethoxylate or comparative polymer | 0.50 or 1.45 |
| Triethanolamine | ad pH 7.5 |
| Demin. water | ad 100 |
| pH value | 7.5 |

* All data are wt % active ingredient, independent of the respective product form.

TABLE 6

Viscosity of liquid laundry formulations.

| Formulation | Polymer | Concentration of polymeric additive * | Viscosity [mPa*s] ** |
|---|---|---|---|
| F.1 | P.1 | 0.50 wt % | 1100 +/− 10 |
| F.1 | P.2 | 0.50 wt % | 1040 +/− 10 |
| F.1 | P.3 | 0.50 wt % | 1060 +/− 10 |
| F.1 | P.4 | 0.50 wt % | 1110 +/− 10 |
| F.1 | P.5 | 0.50 wt % | 1010 +/− 10 |
| F.1 | P.6 | 0.50 wt % | 1190 +/− 10 |
| F.1 | CP.1 | 0.50 wt % | 885 +/− 10 |
| F.1 | CP.2 | 0.50 wt % | 750 +/− 10 |
| F.1 | CP.3 | 0.50 wt % | 550 +/− 10 |
| F.1 | CP.10 | 1.45 wt % | 580 +/− 10 |
| F.1 | CP.11 | 0.50 wt % | 645 +/− 10 |
| F.1 | CP.12 | 1.45 wt % | 1470 +/− 10 |

* All data are wt % active ingredient, independent of the respective product form.
** The linear standard deviation of the applied method is +/−10 mPa*s, derived from measurements of 3 identical formulations.
Note:
Similar to the washing test (cf. table 4), a ca. three times higher concentration level of the PEI ethoxylates CP.10 and CP.12 compared to all other polymers (both inventive and comparative) has been employed.

The results from the viscosity measurements clearly confirm the superiority of the inventive polymers: The polymers of the present invention lead to a significantly higher viscosity of the liquid laundry detergents than the investigated comparative polymers (except comparative polymer CP.12, however, this polymer does not fulfill the target criteria of the polymers of the present invention since its cleaning performance is extremely poor (cf. table 4)), especially than comparative polymers CP.2 and CP.11, which have demonstrated a comparable cleaning performance (CP.11) or only a slightly worse cleaning performance (CP.2) (cf. table 4).

The combination of results from table 4 (cleaning performance) and table 6 (viscosity of liquid laundry detergents) clearly demonstrates that only the polymers of the present invention lead to the desired target profile of superior cleaning performance (especially at low concentrations, preferably <1 wt % in the liquid laundry detergents) AND high viscosity of the detergent formulations.

The invention claimed is:

1. An amphoterically-modified oligopropyleneimine ethoxylates (A) of general formula (I)

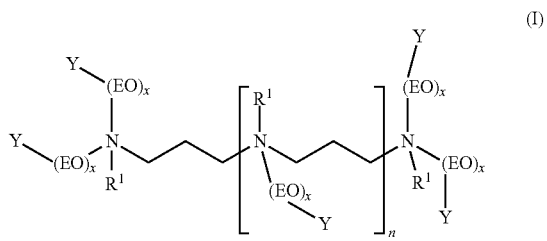

(I)

wherein
$R^1$ are the same or different and selected from $C_1$-$C_4$-alkyl, H and a free electron pair, wherein at least 50% of all $R^1$ are $C_1$-$C_4$-alkyl,
EO means —$CH_2$—$CH_2$—O,
Y are the same or different and selected from the group consisting of $SO_3^-$ and H, wherein at least 30% of all Y are $SO_3^-$,
x are the same or different and selected in a range of from 5 to 50, and n is 1, 2 or 3.

2. The amphoterically-modified oligopropyleneimine ethoxylates (A) according to claim 1, wherein n=1, 2 or 3, at least 80% of $R^1$ are $C_1$-$C_4$-alkyl and the ratio of $R^1$=$C_1$-$C_4$-alkyl to Y=$SO_3^-$ is on average from 1.0:1.0 to 1.0:0.8.

3. The amphoterically-modified oligopropyleneimine ethoxylates (A) according to claim 1, wherein n=2 or 3 and at least 90% of all $R^1$ are methyl.

4. The amphoterically-modified oligopropyleneimine ethoxylates (A) according to claim 1, wherein n=2, at least 90% of all $R^1$ are methyl and x=15-30.

5. A mixture of compounds comprising at least one amphoterically-modified oligopropyleneimine ethoxylate (A) according to claim 1 wherein n=2, and at least one isomeric compound according to formula (II)

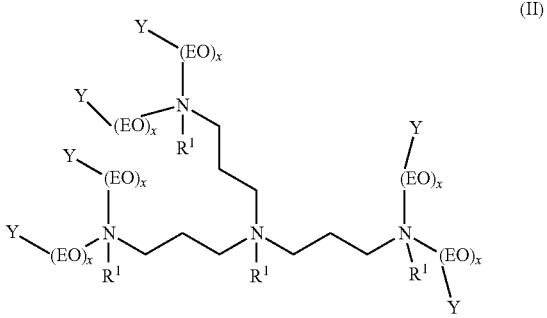

(II)

wherein
$R^1$ are the same or different and selected from the group consisting of $C_1$-$C_4$-alkyl, H and a free electron pair, wherein at least 50%, of all $R^1$ are $C_1$-$C_4$-alkyl,
EO means —$CH_2$—$CH_2$—O,
Y are the same or different and selected from the group consisting of $SO_3^-$ and H, wherein at least 30% of all Y are $SO_3^-$,
x are the same or different and selected in a range of from 5 to 50.

6. The mixture according to claim 5 comprising an amphoterically-modified oligopropyleneimine ethoxylate (A) according to formula (I) and compounds according to formula (II) in a total molar ratio in the range of from 10:1 or higher.

7. The mixture comprising a compound according to claim 5, wherein said mixture additionally comprises the sulfate of an alkali metal and/or an amine.

8. The mixture according to claim 7, wherein said mixture additionally comprises the sulfate salt of an alkanolamine.

9. A process for making amphoterically-modified oligopropyleneimine ethoxylates (A) according to claim 1, said process comprising the steps of
  (a) providing an amine selected from the group consisting of ammonia, 1,3-propylenediamine, bis-(3,3'-aminopropyl)amine, and bis-(3,3'-aminopropyl)-1,3-propylenediamine, and mixtures thereof
  (b) optionally performing cyanoethylation of said amine with acrylonitrile in a ratio from 100:1 to 1:2.5, followed by hydrogenation, to obtain oligopropyleneimines with 2, 3 and 4 repeating units
  (c) optionally performing purification of the oligopropyleneimines from step (b)
  (d) performing ethoxylation of said amine and/or oligopropyleneimine from step a, b or c, and
  (e) performing at least partial quaternization and trans-sulfation with a di-$C_1$-$C_4$-alkyl sulfate.

10. The process according to claim 9, wherein the purification step (c) is performed to obtain oligopropyleneimines with 2, 3 and 4 repeating units, or mixtures thereof, with a purity of at least 80 wt %.

11. The process according to claim 9, wherein the at least partial quaternization in step (e) is performed with dimethyl sulfate.

12. The process according to claim 9, wherein the trans-sulfation in step (e) is performed with sulfuric acid as a catalyst.

13. The process according to claim 9, wherein the trans-sulfation in step (e) is performed more than or equal to 80% and a slightly cationic or net neutral polymer is obtained.

14. The process according to claim 12, wherein said process includes the subsequent step of neutralization of the sulfuric acid with a base selected from the group consisting of alkali metal hydroxides and amines.

15. The process according to claim 14, wherein the base for neutralization of the sulfuric acid is selected from the group consisting of alkanolamines.

16. The process according to claim 9, wherein the ethoxylation in step (d) is performed in two sub-steps:
  (i) conversion with up to one mole of ethylene oxide per N—H function followed by
  (ii) conversion with more ethylene oxide under alkaline catalysis.

17. The amphoterically-modified oligopropyleneimine ethoxylates (A) obtainable by a process according to claim 9.

18. A laundry formulation, comprising at least one of the amphoterically-modified oligopropyleneimine ethoxylates (A) according to claim 1.

19. A laundry formulation according to claim 18, further comprising 2-phenoxyethanol and/or 4,4'-dichloro-2-hydroxydiphenylether.

\* \* \* \* \*